US012559143B2

(12) United States Patent
Goeddel et al.

(10) Patent No.: US 12,559,143 B2
(45) Date of Patent: Feb. 24, 2026

(54) METHOD AND SYSTEM FOR DYNAMICALLY UPDATING AN ENVIRONMENTAL REPRESENTATION OF AN AUTONOMOUS AGENT

(71) Applicant: May Mobility, Inc., Ann Arbor, MI (US)

(72) Inventors: Robert Goeddel, Ann Arbor, MI (US); Collin Johnson, Ann Arbor, MI (US); Melinda Kothbauer, Ann Arbor, MI (US); Jeff Sterniak, Ann Arbor, MI (US); Tom Voorheis, Ann Arbor, MI (US); Edwin B. Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 652 days.

(21) Appl. No.: 17/941,225

(22) Filed: Sep. 9, 2022

(65) Prior Publication Data

US 2023/0001958 A1 Jan. 5, 2023

Related U.S. Application Data

(63) Continuation of application No. 17/554,619, filed on Dec. 17, 2021, now Pat. No. 11,472,444.

(Continued)

(51) Int. Cl.
*B60W 60/00* (2020.01)
*G06T 7/246* (2017.01)
*G06V 20/58* (2022.01)

(52) U.S. Cl.
CPC ....... *B60W 60/00272* (2020.02); *G06T 7/246* (2017.01); *G06V 20/58* (2022.01);

(Continued)

(58) Field of Classification Search
CPC ..... B60W 60/00272; B60W 2420/403; B60W 2556/10; B60W 60/00276; G06T 7/246;

(Continued)

(56) References Cited

U.S. PATENT DOCUMENTS 5,544,282 A 8/1996 Chen et al.
6,199,013 B1 3/2001 Oshea (Continued)

FOREIGN PATENT DOCUMENTS

JP 2011100492 A 5/2011
JP 2015083417 A 4/2015

(Continued)

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).

(Continued)

*Primary Examiner* — Russell Frejd
*Assistant Examiner* — Ana D Thomas
(74) *Attorney, Agent, or Firm* — Buckley, Maschoff & Talwalkar LLC

(57) ABSTRACT

The method for dynamically updating an environmental representation of an autonomous agent can include: receiving a set of inputs; generating an environmental representation; and updating the environmental representation. Additionally or alternatively, the method can include providing the environmental representation to a planning module and/ or any other suitable processes. The method functions to generate and/or dynamically update an environmental representation to facilitate control of an autonomous agent.

21 Claims, 7 Drawing Sheets

Related U.S. Application Data

(60) Provisional application No. 63/126,938, filed on Dec. 17, 2020.

(52) U.S. Cl.
CPC ... *B60W 2420/403* (2013.01); *B60W 2556/10* (2020.02); *G06T 2207/30241* (2013.01); *G06T 2207/30252* (2013.01)

(58) Field of Classification Search
CPC . G06T 2207/30241; G06T 2207/30252; G06T 2207/10016; G06T 2207/10028; G06V 20/58; G06V 10/811
See application file for complete search history.

(56) References Cited

U.S. PATENT DOCUMENTS

| | | |
|---|---|---|
| 9,129,519 B2 | 9/2015 | Aoude et al. |
| 9,274,525 B1 | 3/2016 | Ferguson et al. |
| 9,495,874 B1 | 11/2016 | Zhu et al. |
| 9,618,938 B2 | 4/2017 | Olson et al. |
| 9,646,428 B1 | 5/2017 | Konrardy et al. |
| 9,720,412 B1 | 8/2017 | Zhu et al. |
| 9,811,760 B2 | 11/2017 | Richardson et al. |
| 9,914,452 B1 | 3/2018 | Ferguson et al. |
| 10,012,981 B2 | 7/2018 | Gariepy et al. |
| 10,062,294 B2 | 8/2018 | Kunzi et al. |
| 10,235,882 B1 | 3/2019 | Aoude et al. |
| 10,248,120 B1 | 4/2019 | Siegel et al. |
| 10,372,715 B1 | 8/2019 | James et al. |
| 10,386,856 B2 | 8/2019 | Wood et al. |
| 10,467,891 B1 | 11/2019 | Bart et al. |
| 10,518,770 B2 | 12/2019 | Kroop et al. |
| 10,518,783 B2 | 12/2019 | Tanimichi et al. |
| 10,540,892 B1 | 1/2020 | Fields et al. |
| 10,558,224 B1 | 2/2020 | Lin et al. |
| 10,564,641 B2 | 2/2020 | Vozar et al. |
| 10,564,643 B2 | 2/2020 | Lui et al. |
| 10,571,916 B2 | 2/2020 | Tschanz et al. |
| 10,586,254 B2 | 3/2020 | Singhal |
| 10,599,155 B1 | 3/2020 | Konrardy et al. |
| 10,614,709 B2 | 4/2020 | Vozar et al. |
| 10,642,276 B2 | 5/2020 | Huai |
| 10,654,476 B2 | 5/2020 | Wray et al. |
| 10,671,076 B1 | 6/2020 | Kobilarov et al. |
| 10,860,019 B2 | 12/2020 | Censi et al. |
| 10,909,392 B1 | 2/2021 | Chaudhuri et al. |
| 10,969,470 B2 | 4/2021 | Voorheis et al. |
| 11,086,318 B1 | 8/2021 | Davis et al. |
| 11,087,200 B2 | 8/2021 | Olson et al. |
| 11,242,054 B2 | 2/2022 | Isele |
| 11,260,855 B2 | 3/2022 | Zhang |
| 11,281,213 B2 | 3/2022 | Cross et al. |
| 11,300,957 B2 | 4/2022 | Wray et al. |
| 11,352,023 B2 | 6/2022 | Fairley et al. |
| 11,380,108 B1* | 7/2022 | Cai .................... G06V 10/454 |
| 11,396,302 B2 | 7/2022 | Ye et al. |
| 11,472,436 B1 | 10/2022 | Patel et al. |
| 11,565,717 B2 | 1/2023 | Kothbauer et al. |
| 11,714,971 B2 | 8/2023 | Wray et al. |
| 11,733,703 B2 | 8/2023 | Anthony |
| 11,740,633 B2 | 8/2023 | Gier et al. |
| 2002/0062207 A1 | 5/2002 | Faghri |
| 2004/0100563 A1 | 5/2004 | Sablak et al. |
| 2005/0004723 A1 | 1/2005 | Duggan et al. |
| 2006/0184275 A1 | 8/2006 | Hosokawa et al. |
| 2006/0200333 A1 | 9/2006 | Dalal et al. |
| 2007/0193798 A1 | 8/2007 | Allard et al. |
| 2007/0276600 A1 | 11/2007 | King et al. |
| 2008/0033684 A1 | 2/2008 | Vian et al. |
| 2010/0114554 A1 | 5/2010 | Misra |
| 2010/0204867 A1 | 8/2010 | Longstaff |
| 2011/0142283 A1 | 6/2011 | Huang et al. |
| 2012/0089275 A1 | 4/2012 | Yao-Chang et al. |

| | | |
|---|---|---|
| 2013/0054106 A1 | 2/2013 | Schmuedderich et al. |
| 2013/0141576 A1 | 6/2013 | Lord et al. |
| 2013/0253816 A1 | 9/2013 | Caminiti et al. |
| 2014/0195138 A1 | 7/2014 | Stelzig et al. |
| 2014/0244198 A1 | 8/2014 | Mayer |
| 2014/0309815 A1 | 10/2014 | Ricci et al. |
| 2015/0105961 A1 | 4/2015 | Callow |
| 2015/0284010 A1 | 10/2015 | Beardsley et al. |
| 2015/0302756 A1 | 10/2015 | Guehring et al. |
| 2015/0316928 A1 | 11/2015 | Guehring et al. |
| 2015/0321337 A1 | 11/2015 | Stephens |
| 2015/0344030 A1 | 12/2015 | Damerow et al. |
| 2016/0005333 A1 | 1/2016 | Naouri |
| 2016/0209840 A1 | 7/2016 | Kim |
| 2016/0314224 A1 | 10/2016 | Wei et al. |
| 2017/0031361 A1* | 2/2017 | Olson .................... G06V 20/56 |
| 2017/0032198 A1 | 2/2017 | Gupta et al. |
| 2017/0032671 A1 | 2/2017 | Toyama et al. |
| 2017/0072853 A1 | 3/2017 | Matsuoka et al. |
| 2017/0123419 A1 | 5/2017 | Levinson et al. |
| 2017/0155696 A1 | 6/2017 | Dong et al. |
| 2017/0199523 A1 | 7/2017 | Barton-Sweeney et al. |
| 2017/0268896 A1 | 9/2017 | Bai et al. |
| 2017/0289341 A1 | 10/2017 | Rodriguez et al. |
| 2017/0291560 A1 | 10/2017 | Schroeder et al. |
| 2017/0301111 A1 | 10/2017 | Zhao et al. |
| 2017/0320500 A1 | 11/2017 | Yoo et al. |
| 2017/0323568 A1 | 11/2017 | Inoue et al. |
| 2017/0356748 A1 | 12/2017 | Iagnemma |
| 2018/0011485 A1 | 1/2018 | Ferren |
| 2018/0046182 A1 | 2/2018 | Joyce et al. |
| 2018/0047291 A1 | 2/2018 | Konishi et al. |
| 2018/0053102 A1 | 2/2018 | Martinson et al. |
| 2018/0070056 A1 | 3/2018 | Deangelis et al. |
| 2018/0082596 A1 | 3/2018 | Whitlow |
| 2018/0089563 A1 | 3/2018 | Redding et al. |
| 2018/0100743 A1 | 4/2018 | Diaz et al. |
| 2018/0183873 A1 | 6/2018 | Wang et al. |
| 2018/0184352 A1 | 6/2018 | Lopes et al. |
| 2018/0196427 A1 | 7/2018 | Majumdar et al. |
| 2018/0220283 A1 | 8/2018 | Condeixa et al. |
| 2018/0224851 A1 | 8/2018 | Park |
| 2018/0251126 A1 | 9/2018 | Linscott et al. |
| 2018/0268281 A1 | 9/2018 | Olson et al. |
| 2018/0281815 A1 | 10/2018 | Stentz |
| 2018/0293537 A1 | 10/2018 | Kwok |
| 2018/0299898 A1 | 10/2018 | Luo et al. |
| 2018/0330481 A1 | 11/2018 | Watanabe et al. |
| 2018/0365908 A1 | 12/2018 | Liu et al. |
| 2018/0367997 A1 | 12/2018 | Shaw et al. |
| 2019/0027034 A1 | 1/2019 | Xu et al. |
| 2019/0039545 A1 | 2/2019 | Kumar et al. |
| 2019/0066399 A1 | 2/2019 | Jiang et al. |
| 2019/0096244 A1 | 3/2019 | Guruva Reddiar et al. |
| 2019/0106117 A1 | 4/2019 | Goldberg |
| 2019/0113919 A1 | 4/2019 | Englard et al. |
| 2019/0130878 A1 | 5/2019 | Bradley |
| 2019/0138524 A1 | 5/2019 | Singh et al. |
| 2019/0147610 A1* | 5/2019 | Frossard ................ G06N 3/045 |
| | | 382/103 |
| 2019/0180529 A1 | 6/2019 | Smith |
| 2019/0196465 A1 | 6/2019 | Hummelshøj |
| 2019/0220011 A1 | 7/2019 | Della Penna |
| 2019/0227553 A1 | 7/2019 | Kentley-Klay et al. |
| 2019/0236950 A1 | 8/2019 | Li et al. |
| 2019/0258246 A1 | 8/2019 | Liu et al. |
| 2019/0258251 A1 | 8/2019 | Ditty et al. |
| 2019/0265059 A1 | 8/2019 | Warnick et al. |
| 2019/0271554 A1 | 9/2019 | Colgate et al. |
| 2019/0271981 A1 | 9/2019 | Oba |
| 2019/0291726 A1 | 9/2019 | Shalev-Shwartz et al. |
| 2019/0331758 A1 | 10/2019 | Malkes et al. |
| 2019/0332106 A1 | 10/2019 | Belloni Mourao et al. |
| 2019/0332110 A1 | 10/2019 | Isele et al. |
| 2019/0337509 A1 | 11/2019 | Shalev-Shwartz et al. |
| 2020/0004241 A1 | 1/2020 | Levinson et al. |
| 2020/0020226 A1 | 1/2020 | Stenneth et al. |
| 2020/0026286 A1 | 1/2020 | Vozar et al. |
| 2020/0057441 A1 | 2/2020 | Wang et al. |

(56) References Cited

U.S. PATENT DOCUMENTS

| | | | |
|---|---|---|---|
| 2020/0094850 A1 | 3/2020 | Chi et al. | |
| 2020/0097003 A1 | 3/2020 | Wray et al. | |
| 2020/0098269 A1 | 3/2020 | Wray et al. | |
| 2020/0104289 A1 | 4/2020 | Premawardena | |
| 2020/0122830 A1 | 4/2020 | Anderson et al. | |
| 2020/0124447 A1 | 4/2020 | Schwindt et al. | |
| 2020/0139973 A1 | 5/2020 | Palanisamy et al. | |
| 2020/0159227 A1 | 5/2020 | Cohen et al. | |
| 2020/0189731 A1 | 6/2020 | Mistry et al. | |
| 2020/0209853 A1 | 7/2020 | Leach et al. | |
| 2020/0209864 A1 | 7/2020 | Chen | |
| 2020/0233060 A1 | 7/2020 | Lull et al. | |
| 2020/0255027 A1 | 8/2020 | Kulkarni et al. | |
| 2020/0269843 A1* | 8/2020 | Wissing | B60W 30/18163 |
| 2020/0290619 A1 | 9/2020 | Mehdi et al. | |
| 2020/0293041 A1 | 9/2020 | Palanisamy | |
| 2020/0294401 A1 | 9/2020 | Kerecsen | |
| 2020/0346666 A1 | 11/2020 | Wray et al. | |
| 2020/0355820 A1 | 11/2020 | Zeng et al. | |
| 2020/0369294 A1 | 11/2020 | Jeon et al. | |
| 2020/0400781 A1 | 12/2020 | Voorheis et al. | |
| 2021/0042535 A1 | 2/2021 | Abbott et al. | |
| 2021/0116907 A1 | 4/2021 | Altman | |
| 2021/0163021 A1 | 6/2021 | Frazzoli et al. | |
| 2021/0181758 A1 | 6/2021 | Das et al. | |
| 2021/0197864 A1 | 7/2021 | Oltmann et al. | |
| 2021/0200207 A1 | 7/2021 | Soryal et al. | |
| 2021/0208244 A1 | 7/2021 | Voorheis et al. | |
| 2021/0229697 A1 | 7/2021 | Lee et al. | |
| 2021/0245785 A1 | 8/2021 | Suzuki et al. | |
| 2021/0269063 A1 | 9/2021 | Lee et al. | |
| 2021/0271249 A1 | 9/2021 | Kobashi et al. | |
| 2021/0284183 A1 | 9/2021 | Marenco et al. | |
| 2021/0286651 A1 | 9/2021 | Ho et al. | |
| 2021/0365701 A1 | 11/2021 | Eshet et al. | |
| 2022/0063674 A1 | 3/2022 | De Francesco et al. | |
| 2022/0076032 A1* | 3/2022 | Jain | G06V 20/588 |
| 2022/0081005 A1* | 3/2022 | Brown | G08G 1/162 |
| 2022/0126878 A1* | 4/2022 | Moustafa | G08G 1/096758 |
| 2022/0144306 A1 | 5/2022 | Narang et al. | |
| 2022/0169263 A1 | 6/2022 | Li et al. | |
| 2022/0204010 A1 | 6/2022 | Zhu et al. | |
| 2022/0230080 A1 | 7/2022 | Isele et al. | |
| 2022/0332350 A1* | 10/2022 | Jha | H04W 4/023 |
| 2022/0371595 A1* | 11/2022 | Meuresch | G08G 1/167 |
| 2023/0166764 A1 | 6/2023 | Johnson et al. | |
| 2023/0174103 A1 | 6/2023 | Patel et al. | |

FOREIGN PATENT DOCUMENTS

| | | | |
|---|---|---|---|
| JP | 2016091039 A | 5/2016 | |
| JP | 2016184276 A | 10/2016 | |
| WO | 2015160900 A1 | 10/2015 | |

OTHER PUBLICATIONS

Mehta, D. , et al., "Autonomous Navigation in Dynamic Social Environments Using Multi-Policy Decision Making", Proceedings of the IEEE/RSJ International Conference on Intelligent Robots and Systems (IROS) (2016).

Mehta, D. , et al., "Fast Discovery of Influential Outcomes for Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B. , et al., "A Survey of Motion Planning and Control Techniques for Self-driving Urban Vehicles", IEEE Transactions on Intelligent Vehicles, vol. 1, Ids. 1, (Jun. 13, 2016).

Straub, J. , "Comparing the Effect of Pruning on a Best Path and a Naive-approach Blackboard Solver", International Journal of Automation and Computing (Oct. 2015).

Wuthishuwong, Chairit , et al., "Vehicle to Infrastructure based Safe Trajectory Planning for Autonomous Intersection Management", 2013 13th International Conference on ITS Telecommunications (ITST) (Year: 2013).

De Waard H , "Basic methods for data association", A new approach to distributed data fusion, Feb. 2, 2008 (Feb. 2, 2008), XP093206383, Retrieved from the Internet: URL:https://pure.uva.nl/ws/files/4318786/59162_07.pdf [retrieved on Sep. 18, 2024] * section 2.6.3, 1st paragraph*.

Crossman, Jacob , et al., "Method and System for Assessing and Mitigating Risks Encounterable by an Autonomous Vehicle", U.S. Appl. No. 18/538,312, filed Dec. 13, 2023.

* cited by examiner

100

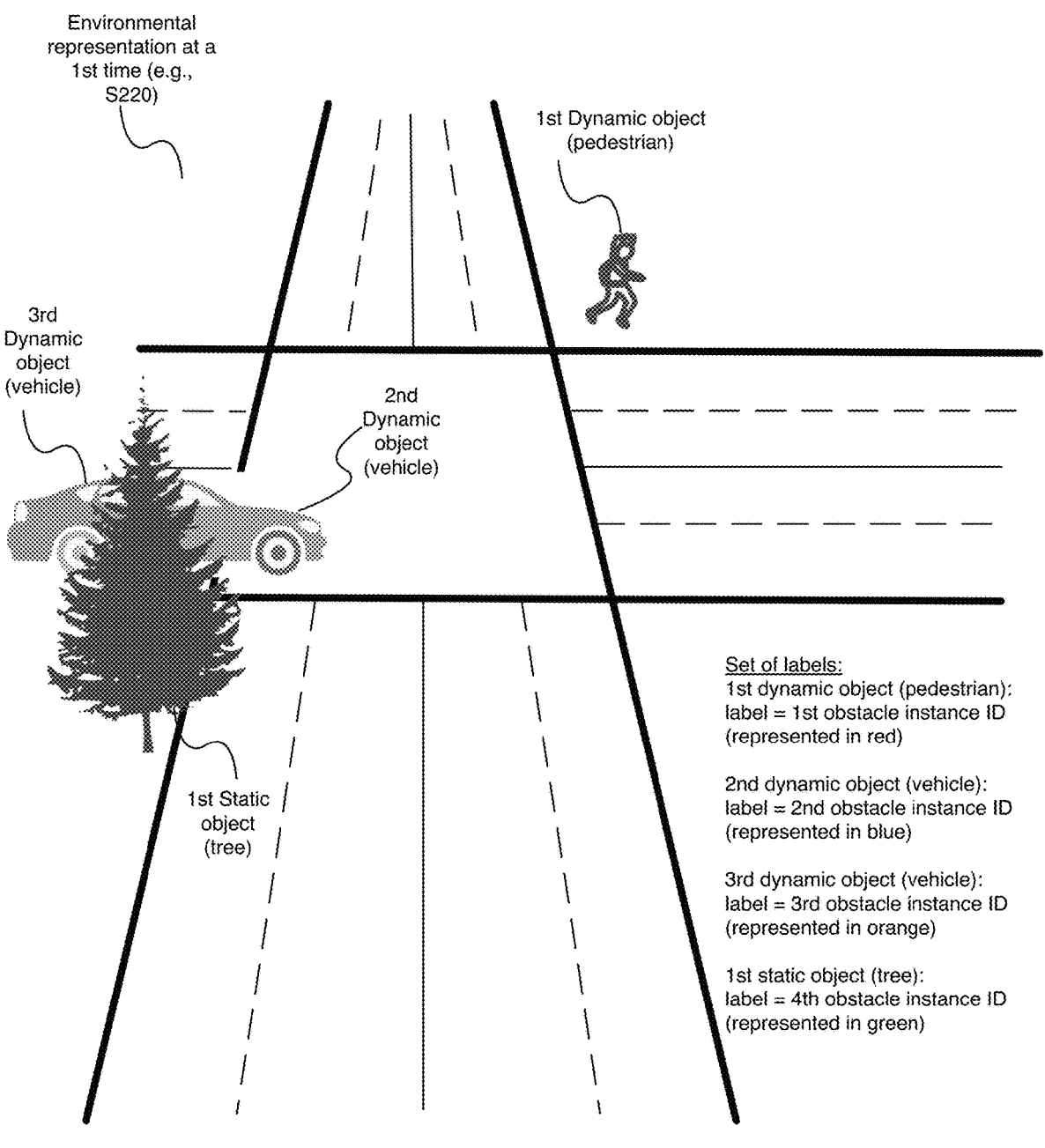

Environmental representation at a 1st time (e.g., S220)

1st Dynamic object (pedestrian)

3rd Dynamic object (vehicle)

2nd Dynamic object (vehicle)

1st Static object (tree)

Set of labels:
1st dynamic object (pedestrian):
label = 1st obstacle instance ID
(represented in red)

2nd dynamic object (vehicle):
label = 2nd obstacle instance ID
(represented in blue)

3rd dynamic object (vehicle):
label = 3rd obstacle instance ID
(represented in orange)

1st static object (tree):
label = 4th obstacle instance ID
(represented in green)

FIGURE 3A

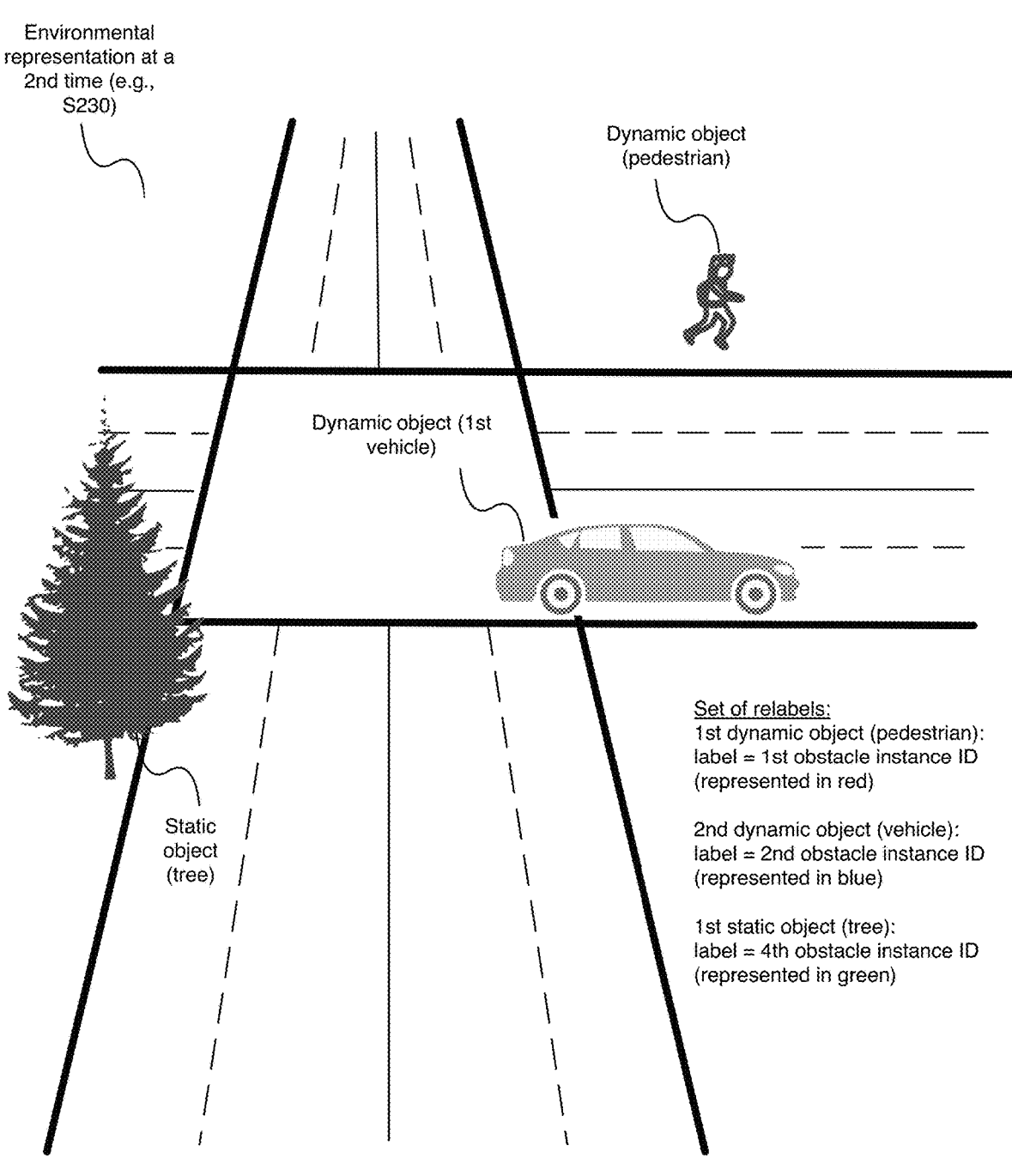

Environmental representation at a 2nd time (e.g., S230)

Dynamic object (pedestrian)

Dynamic object (1st vehicle)

Static object (tree)

Set of relabels:
1st dynamic object (pedestrian): label = 1st obstacle instance ID (represented in red)

2nd dynamic object (vehicle): label = 2nd obstacle instance ID (represented in blue)

1st static object (tree): label = 4th obstacle instance ID (represented in green)

FIGURE 3B

METHOD AND SYSTEM FOR DYNAMICALLY UPDATING AN ENVIRONMENTAL REPRESENTATION OF AN AUTONOMOUS AGENT

CROSS REFERENCE TO RELATED APPLICATIONS

This application is a continuation of U.S. application Ser. No. 17/554,619, filed 17 Dec. 2021, which claims the benefit of U.S. Provisional Application No. 63/126,938, filed 17 Dec. 2020, each of which is incorporated herein in its entirety by this reference.

TECHNICAL FIELD

This invention relates generally to the autonomous vehicle field, and more specifically to a new and useful system and method for dynamically updating an environmental representation of an autonomous agent in the autonomous vehicle field.

BACKGROUND

In the autonomous vehicle field, it is crucial for the agent to have an accurate understanding of its environment, in order to determine and execute optimal and safe trajectories. As the agent travels along a route, it is continuously collecting information, and its understanding of its environment can change. In conventional systems and methods, if the agent's understanding of its environment changes, it is extremely difficult to store the updated information, let alone implement it in decision-making and/or planning.

Thus, there is a need to create an improved and useful system and method for dynamically updating an environmental representation of an autonomous agent in the autonomous vehicle field.

BRIEF DESCRIPTION OF THE FIGURES

FIGS. 3A-3B depict a relabeling of a vehicle in an environment of the agent.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
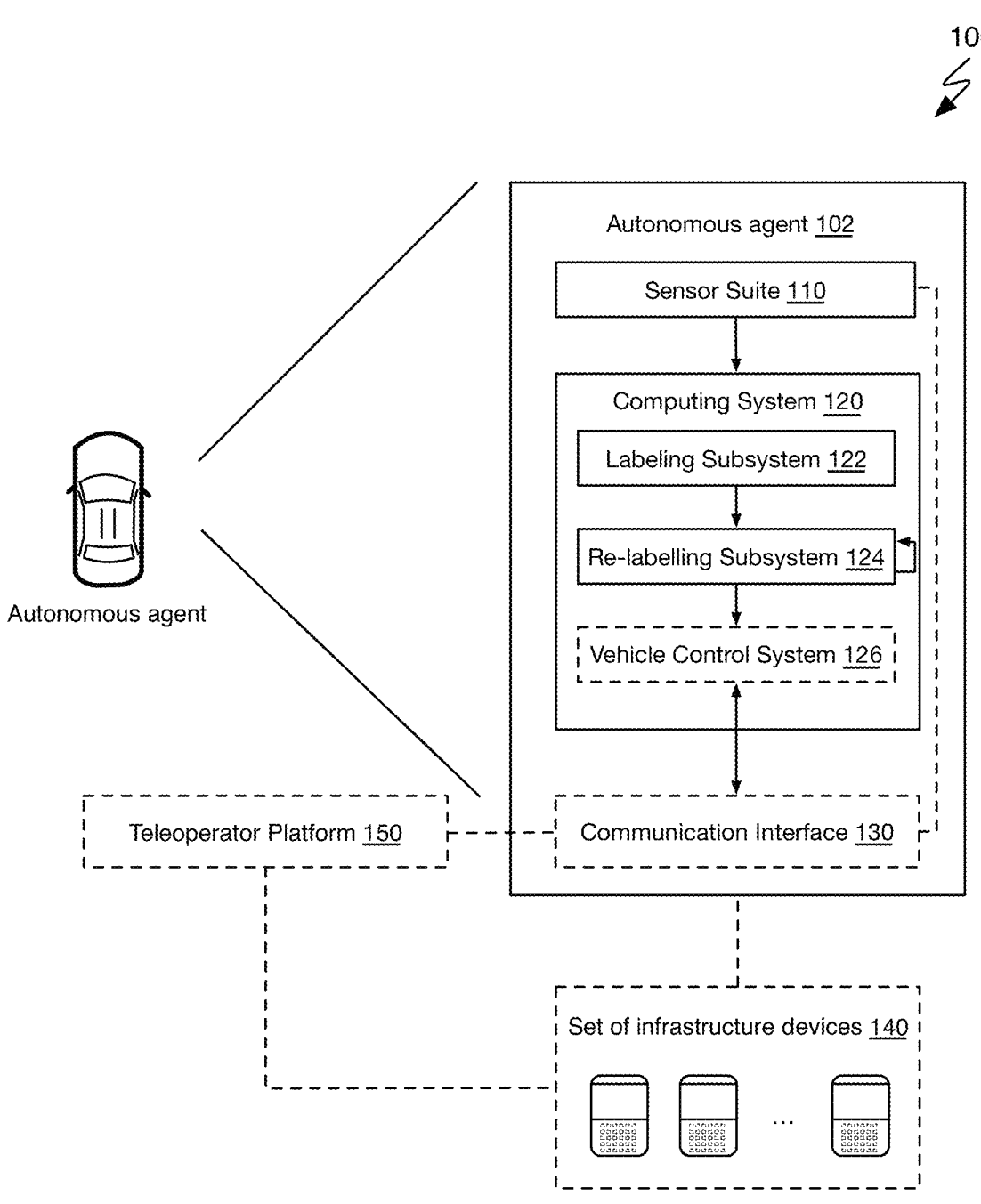
FIG. 1 is a schematic of a system for dynamically updating an environmental representation of an autonomous agent in the autonomous vehicle field.

The system 100, an example of which is shown in FIG. 1, can include: a sensor suite 110; a computing system 120; and/or any other suitable components. The computing system can include: a labeling subsystem 122; a relabeling subsystem 124; an optional vehicle control system 126; and/or any other suitable components. The system can further optionally include any or all of: a communication interface 130, a set of infrastructure devices 140, a teleoperator platform 150, and/or any other components. The system 100 functions to generate and/or refine an environmental representation to facilitate control of an autonomous agent. Additionally or alternatively, the system can function to facilitate execution of the method S200.

As shown in FIG. 1, a system 100 for dynamically updating an environmental representation can include and/or interface an autonomous agent 102. Additionally or alternatively, the system can include or all of the components as described in U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; U.S. application Ser. No. 16/792,780, filed 17 Feb. 2020, now issued as U.S. Pat. No. 10,969,470; and U.S. application Ser. No. 17/365,538, filed 1 Jul. 2021; each of which is incorporated herein in its entirety by this reference.

Figure 2:
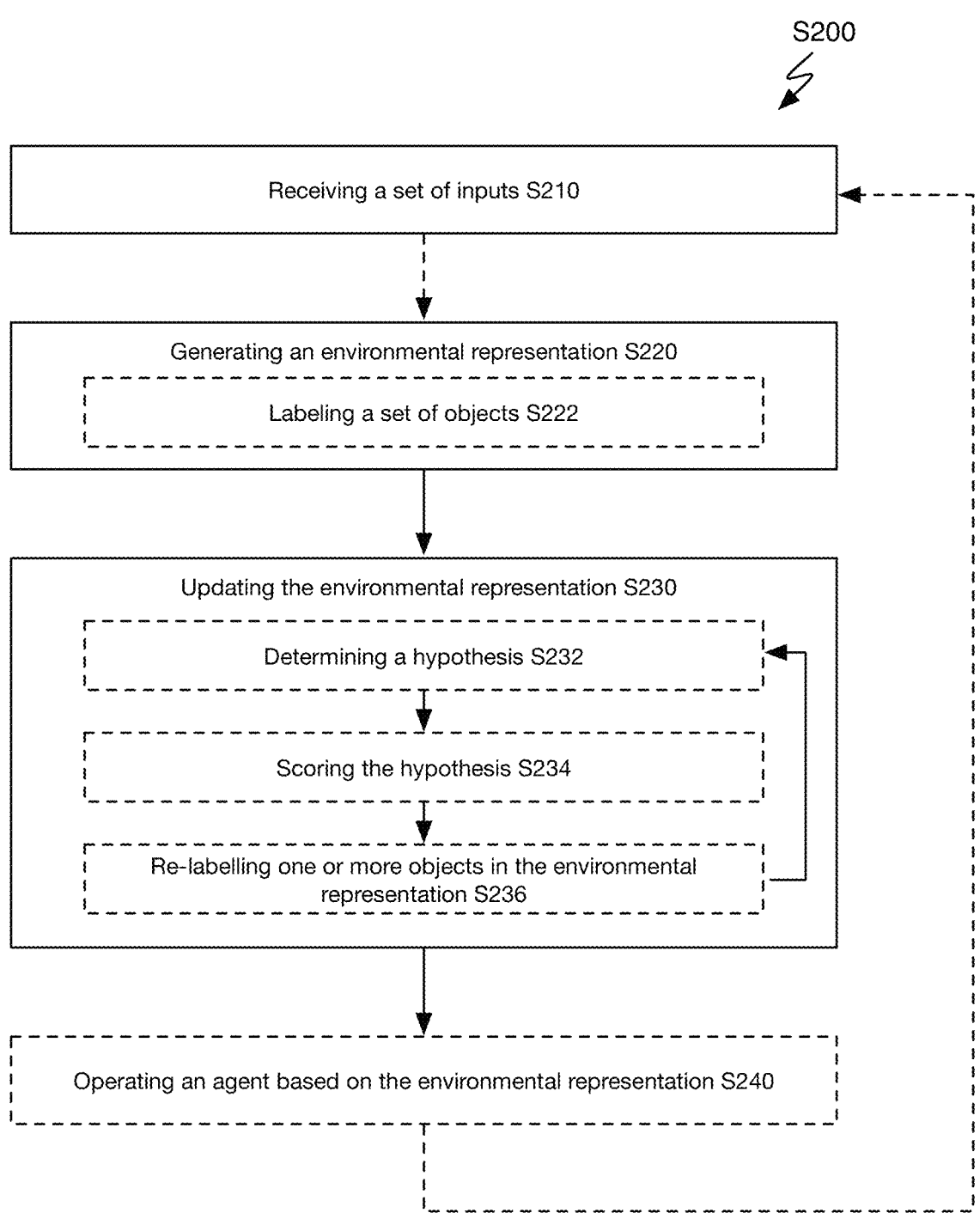
FIG. 2 is a schematic of a method for dynamically updating an environmental representation of an autonomous agent in the autonomous vehicle field.

As shown in FIG. 2, the method S200 for dynamically updating a world representation of an autonomous agent includes receiving a set of inputs S210; generating an environmental representation S220; and updating the environmental representation S230. Additionally or alternatively, the method S200 can include operating an agent based on the environmental representation S240 (e.g., providing the environmental representation to a planning module) and/or any other suitable processes. The method S200 functions to generate and/or dynamically update an environmental representation to facilitate control of an autonomous agent.

Additionally or alternatively, the method S200 can include any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020, now issued as U.S. Pat. No. 10,969,470; and U.S. application Ser. No. 17/365,538, filed 1 Jul. 2021; each of which is incorporated herein in its entirety by this reference, or any other suitable processes performed in any suitable order.

The method S200 can be performed with a system as described above and/or any other suitable system.

The term "frame" as utilized herein can refer to an environmental representation corresponding to a distinct timestep/update interval of the vehicle control system (e.g., according to a predetermined tracking cycle, according to a dynamically determined tracking cycle, etc.) and/or a vehicle planner therein. As an example, the time history of an environmental representation may be understood/interpreted as a series of frames, within which an object can be tracked (e.g., in a time domain, based on the update interval and/or time period between frames). Additionally or alternatively, the term frame can refer to a coordinate system (a.k.a. coordinate frame; such as an ego vehicle frame) at a particular time and/or the data received from a set of sensors at a particular time (e.g., frame of data from imaging or time-of-flight sensor, etc.). However, the term frame can be otherwise suitably referenced and/or may have any other suitable meaning.

In variants, a labeling subsystem 122 and/or a relabeling subsystem 124 can function in the role of a "tracker", "object tracker" and/or "object tracking system" insofar as they individually and/or collectively track objects through a time-history of the environment (e.g., historical environmental representations). Accordingly, the labeling subsystem and/or relabeling subsystem can be individually and/or collectively be referenced herein as a "tracker," "object tracker," "object tracking system," and/or other like terms; or may be otherwise suitably referenced. As an example, the labelling subsystem can function as a primitive tracker (and/or primitive object tracker) which generates a primitive environmental representation, including primitive object tracks, which may be subsequently refined by the relabeling subsystem. As a second example, the relabeling subsystem can function to track and/or refine object trajectories to generate an updated (refined) environmental representation based on historical environmental representations. As a third example, the labeling subsystem 122 and the relabeling subsystem 124 can collectively function as a tracker and/or tracking system, receiving sensor data inputs (e.g., individual sensor data, which may include object associations) and tracking/labeling objects through a time-history of the environment (e.g., historical environmental representations) to generate an updated/refined environmental representation. As a fourth example, the labeling subsystem 122 and the relabeling subsystem 124 can collectively operate within a single tracking cycle and/or update interval. However, the terms "tracker," "object tracker," and/or "object tracking system," can be otherwise suitably referenced.

1.1 Examples

In one variant, a method can include: determining a set of measurement inputs using a sensor suite of a vehicle; using an object tracking system, generating an environmental representation based on the measurement inputs, the environmental representation comprising a set of labelled objects in an environment of the vehicle; determining one or more hypotheses for at least a subset of the set of labelled objects; determining a score for each hypothesis based on a plurality of historical environmental representations associated with the subset of labelled objects; based on the score, updating the environmental representation, including: relabeling the subset of objects based on the hypothesis; and providing the updated environmental representation to a processor onboard the vehicle. In an example, the method can further include autonomously controlling the vehicle using the processor and based on the updated environmental representation.

In an illustrative example, a method can include maintaining an environmental representation for a vehicle by repeatedly: at the start of a vehicle tracking cycle, generating an current environmental representation by labelling objects (e.g., using an object tracker) in the ego-vehicle frame using current sensor measurements, and, during a remainder of the tracking cycle, refining the environmental representation by merging and/or splitting objects to improve a score and/or goal and/or objective (e.g., based on smooth object trajectories, based on other metrics, etc.) over a recent time history. At the end of each tracking cycle, the refined environmental representation can be used to autonomously control the vehicle.

In additional or alternative variations, the method can include a subset of these processes, additional processes, and/or any combination of processes.

2. Benefits

The system and method for dynamically updating an environmental representation of an autonomous agent can confer several benefits over current systems and methods.

Figure 6:
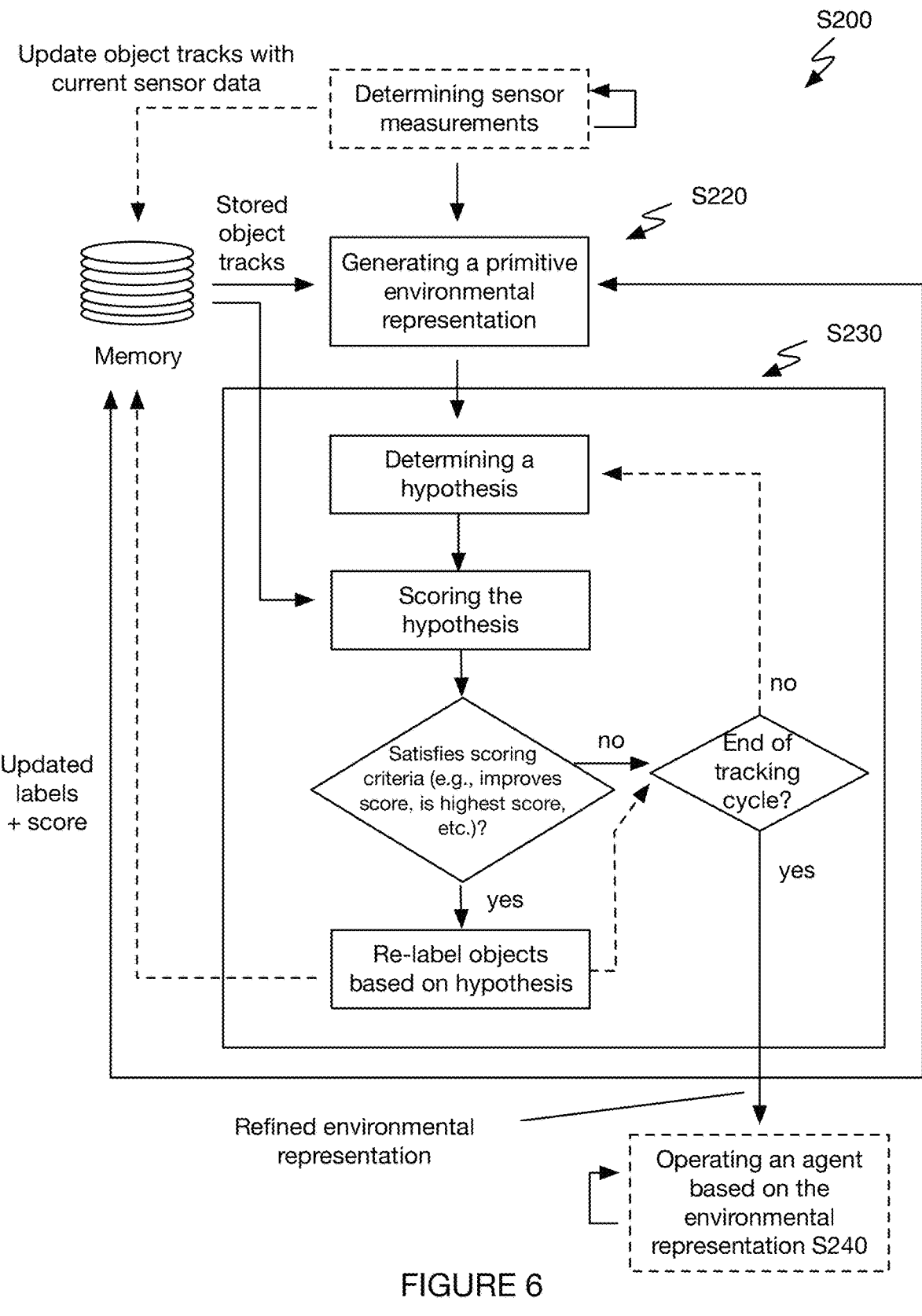
FIG. 6 is a schematic representation of a variant of the method.

First, variations of the technology can provide a recoverable history of objects and/or object states in an environment of an autonomous agent. Such variants can apply smoothing techniques which evaluate the environment and/or objects therein over an extended time history (e.g., multiple sensing frames and/or intervals) to improve an overall estimate when compared to filtering approaches (e.g., where an instantaneous timestep may be evaluated against the immediately preceding timestep; where the t−1 timestep captures all historical information used to evaluate at timestep t; etc.). Such 'smoothing' variants may avoid cascading effects, since objects in an environment of the agent can be relabeled in future timesteps and/or prior incorrect labels assigned to the objects can be retroactively corrected (e.g., without cascading effects; an example is shown in FIG. 6), thereby enabling an accurate time history of the agent's environment to be used in decision-making. However, variants may otherwise facilitate recovery of an object state history.

Second, variations of the technology can be adaptable to the time and/or resource requirements of an autonomous agent or autonomous vehicle (AV) application, such as by being customizable with respect to the amount of time and/or computing resources spent on dynamically updating the environmental representation. In specific examples, for instance, a number of iterations of updates and/or a level of computing performed in each update (e.g., number of computing subsystems employed in proposing a new set of labels) can be confined by any number of constraints. Moreover, variants can provide natural degradation of environmental awareness as computational complexity approaches the resource constraints, which can facilitate scalability of the system/method into increasingly complex environments and AV settings (e.g., without missing update intervals due to convergence failures, losing state history, etc.).

Third, variations of the technology can provide cumulative knowledge gain (e.g., over a series of updated environmental representations) to improve efficiency and/or amortize computation over multiple iterations (e.g., within a single frame or update interval; across multiple update intervals; etc.). In specific examples, a cost function being optimized for has its results carried over from iteration to iteration.

Fourth, variations of the technology can provide robust sensor fusion, since the preserved object state history can allow sensor fusion across multiple time intervals/update cycles. As an example, separate object tracks can be preserved in a state history (e.g., even when not fused/recognized as a common object detection in the original frame) and subsequently merged/fused (or segmented/split). In variants, the environmental representation can be generated using low level sensors, low level sensor data (e.g., low level time-of-flight returns rather than feature detections, etc.), and/or low-level compute, while still enabling the agent to have a comprehensive and high confidence understanding of its environment.

Fifth, variations of the technology can provide technical solutions necessarily rooted in computer technology to overcome issues specifically arising with computer technology, such as environmental awareness for autonomous vehicle planning/control, recovery of a state history of an object environment, object detection/classification, and/or other computer technology challenges. In addition, or alternative to autonomous vehicle applications, the system and/or method can be used in any or all of a numerous set of applications, such as but not limited to, any or all: traffic monitoring, military applications, air traffic control, and/or any other suitable applications.

Additionally or alternatively, the system and method can confer any other benefits.

3. System

The system 100 can include: a sensor suite 110; a computing system 120; and/or any other suitable components. The computing system can include: a labeling subsystem 122; a relabeling subsystem 124; an optional vehicle control system 126; and/or any other suitable components. The system can further optionally include a communication interface 130, a set of infrastructure devices 140, a teleoperator platform 150, and/or any other suitable components. The system 100 functions to generate and/or refine an environmental representation to facilitate control of an autonomous agent. Additionally or alternatively, the system can function to facilitate execution of the method S200.

The system 100 preferably includes an autonomous vehicle (equivalently referred to herein as an autonomous agent and/or ego agent), however the system can additionally or alternatively be integrated into and/or used with an autonomous agent/vehicle and/or any other suitable vehicle. The autonomous vehicle is preferably a fully autonomous and/or able to be operated as a fully autonomous vehicle, but can additionally or alternatively be any semi-autonomous or fully autonomous vehicle. Additionally, or alternatively, the autonomous agent can be a vehicle that switches between a semi-autonomous state and a fully autonomous state (or a fully-manned state) and thus, the autonomous agent can have attributes of both a semi-autonomous vehicle and a fully autonomous vehicle depending on the state of the autonomous agent.

In preferred variations, the autonomous vehicle is an automobile (e.g., car, driverless car, bus, shuttle, taxi, rideshare vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The sensor suite 110 functions to collect inputs for the computing system, and/or can function to execute Block S210 of the method. The sensor suite can include vehicle sensors onboard the autonomous agent, such as any or all of: inertial sensors (e.g., accelerometers, gyroscopes, magnetometer, IMU, INS, etc.), external antennas (e.g., GPS, cellular, Bluetooth, Wi-Fi, Near Field Communication, etc.), diagnostic sensors (e.g., engine load, tire pressure, temperature sensors, etc.), vehicle movement sensors (e.g., inertial sensors, wheel-speed sensors, encoders, resolvers, etc.), environmental sensors (e.g., cameras, time-of-flight sensors, temperature sensors, wind speed/direction sensors, barometers, etc.), guidance sensors (e.g., lidar, Radar, sonar, cameras, etc.), computer vision (CV) sensors, cameras (e.g., stereocamera, hyperspectral, multi-spectral, video camera, wide-angle, CMOS, CCD, etc.), time-of-flight sensors (e.g., Radar, Lidar, sonar, etc.), and/or any other suitable sensors. The sensor suite preferably includes sensors onboard the autonomous vehicle (e.g., Radar sensors and/or Lidar sensors and/or cameras coupled to an exterior surface of the agent, IMUs and/or encoders coupled to and/or arranged within the agent, etc.), but can additionally or alternatively include sensors remote from the agent (e.g., as part of one or more infrastructure devices, sensors in communication with the agent, etc.), and/or any suitable sensors at any suitable locations. However, the sensor suite can include any other suitable set of sensors, and/or can be otherwise suitably configured.

The computing system 130 functions to determine the environmental representation (e.g., classify objects, determine object motion, perform intent estimation, etc.). Additionally or alternatively, the computing system can perform any or all of the processes involved in: perception, prediction, localization, planning, and/or any other processes involved in operation of the autonomous agent. The computing system preferably includes an onboard computing system arranged onboard (e.g., integrated within) the autonomous agent, but can additionally or alternatively include any or all of: a remote computing system (e.g., cloud computing system, remote computing in communication with an onboard computing system, in place of an onboard computing system, etc.), a computing system integrated in a supplementary device (e.g., mobile device, user device, etc.), an edge device including mobile computing devices, and/or any other suitable computing systems and devices.

The computing system preferably includes a processing system (e.g., graphical processing unit or GPU, central processing unit or CPU, or any suitable processing circuitry) and memory, but can additionally or alternatively include any other suitable components. The memory can be short term (e.g., volatile, non-volatile, random access memory or RAM, etc.), long term (e.g., flash memory, hard disk, etc.) memory, or any combination. In some variations, for instance, the onboard computing system operates to interact with and/or operably control any or one or more of the identified components or modules described herein. For instance, the onboard computing system can function to implement and/or execute computer instructions for implementing a multi-policy decisioning module, a synchronization module, and/or the like. In specific examples, the processing system and memory collectively function to dynamically manage the set of policies available to the autonomous agent (e.g., determined based on the method S200) in the framework of a multi-policy decision making framework, such as that described in U.S. application Ser. No. 16/514,624, filed 17 Jul. 2019, which is incorporated herein in its entirety by this reference. Additionally or alternatively, the processing system and memory, and/or any other suitable components, can be used for any other suitable functions.

The computing system (e.g., onboard computing system) preferably functions to control the autonomous agent and process sensed data from the sensor suite (e.g., a computer vision system, LIDAR, flash LIDAR, wheel speed sensors, GPS, etc.) of the autonomous agent and/or other sensors (e.g., from infrastructure devices) to determine states of the autonomous agent and/or states of agents in an operating environment of the autonomous agent. Based upon the states of the autonomous agent and/or agents in the operating environment and programmed instructions, the onboard computing system preferably modifies or controls behavior of autonomous agent, such as through the selection of a behavioral policy. Additionally, or alternatively, the computing system can include a multi-policy decision-making module that functions to generate behavioral policies and select a behavioral policy (e.g., change lanes, merge, maintain current lane, turn left, turn right, pull over, slow down, speed up, stop at light, stop at stop sign, yield, etc.) that the computing system can execute to control a behavior of the autonomous agent. In some variations, for instance, the multi-policy decision-making module includes and/or interfaces with any or all of the systems described in: U.S. application Ser. No. 16/514,624, filed 17 Jul. 2019, now issued as U.S. Pat. No. 10,564,641; and/or U.S. application Ser. No. 17/365,538, filed 1 Jul. 2021; each of which is incorporated herein in its entirety by this reference.

The computing system 120 can include a labeling subsystem 122, which functions to execute Block S220 of the method and/or generate an environmental representation based on inputs of the autonomous agent (e.g., received from the sensor suite 110). The labeling subsystem 122 preferably generates an environmental representation using a set of one or more classifiers (e.g., dynamic object classifiers, static object classifiers, etc.; binary classifiers, multi-class classifiers, etc.), but can additionally or alternatively be performed with any or all of: computer vision techniques, machine learning models, object segmentation techniques, point cloud clustering, neural networks (e.g., pretrained to identify a specific set of objects-such as cars or pedestrians-based on the received inputs, etc.; convolutional neural network [CNN], fully convolutional network [FCN], etc.), object detectors/classifiers (e.g., You Only Look Once [YOLO] algorithm; non-neural net approaches such as Histogram of Oriented Gradients [HOG] and/or Scale-Invariant Feature Transform [SIFT] feature detectors, etc.), object trackers, and/or any other suitable elements. However, the computing system can include any other suitable labeling subsystem, and/or can otherwise generate an environmental representation in accordance with Block S220 of the method.

The computing system 120 can include a relabeling subsystem 124, which functions to evaluate and/or refine to the environmental representation (e.g., with a evaluating hypotheses for the environmental representation). Additionally or alternatively, the relabeling subsystem can function to update labels of an environmental representation to reduce (perceived) inaccuracies, such as according to an objective function and/or various optimization technique. Additionally or alternatively, the relabeling subsystem can execute Block S230 of the method. The relabeling sub-system can be rule-based, programmatic, rely on one or more decision trees or other models, and/or can otherwise suitably refine the environmental representation. In variants, the relabeling subsystem can include any or all of: machine learning models, deep learning models (e.g., neural network), and/or any other trained model. In specific examples S230 can be executed by way of an ensemble method (e.g., boosting ensemble method, bagging ensemble method, stacking ensemble method, etc.) to process the (e.g., in parallel). In variants, the relabeling subsystem can relabel and/or update the environmental representation (e.g., in accordance with S230) by evaluating multiple scores with a nonlinear optimization process, wherein the evaluation reflects a confidence in the output labels relative to a particular cost function/loss function. Additionally or alternatively, the relabeling subsystem can be associated with other optimization processes and/or any other suitable processes. In preferred variations, the optimization process of a relabeling subsystem can be designed to construct a smooth trajectory for each object/label (e.g., in accordance with S220 and/or S230 of the method).

In variants, the processing at the labeling subsystem and the relabeling subsystem can be executed: in parallel (e.g., at different processing nodes), serially (e.g., the relabeling subsystem can iteratively optimize based on an environmental representation received from the labeling subsystem for a current time step), synchronously (e.g., the labeling subsystem can generate an environmental representation for an N+1 time step while the relabeling subsystem optimizes a prior-received environmental representation generated by the labeling subsystem for an N time-step), asynchronously (e.g., the labeling subsystem can consume processing bandwidth for a first portion of an update interval or tracking cycle while the relabeling subsystem can consume processing bandwidth during a second portion of the update interval), and/or or with any other suitable timing and/or relationship.

However, the computing system can include any other suitable relabeling subsystem and/or method Block S230 can be otherwise suitably executed.

The computing system can optionally include and/or interface with a vehicle control system 126 including one or more controllers and/or control systems, which function to control autonomous operations and/or actions of the autonomous agent (e.g., at drive-by-wire braking, steering, and/or accelerating components, etc.) based on commands (e.g., trajectories) generated by one or more computing systems. Additionally or alternatively, one or more controllers can function to implement machine learning techniques to assist the functionality of the controller, such as feature detection/ classification, obstruction mitigation, route traversal, mapping, sensor integration, ground-truth determination, and/or enable any other suitable functionalities. The controller can include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented.

Additionally or alternatively, the system can include any or all of: a positioning system (e.g., including location sensors of the sensor system), a guidance system, and/or any suitable components.

In preferred variations, the computing system includes, implements, and/or interfaces with a set of relabeling subsystems (e.g., as described below).

The system 100 can optionally include a communication interface 130 in communication with the computing system, which functions to enable information to be received at (e.g., from infrastructure devices 140, from a remote computing system and/or remote server, from a teleoperator platform 150, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

Figure 4:
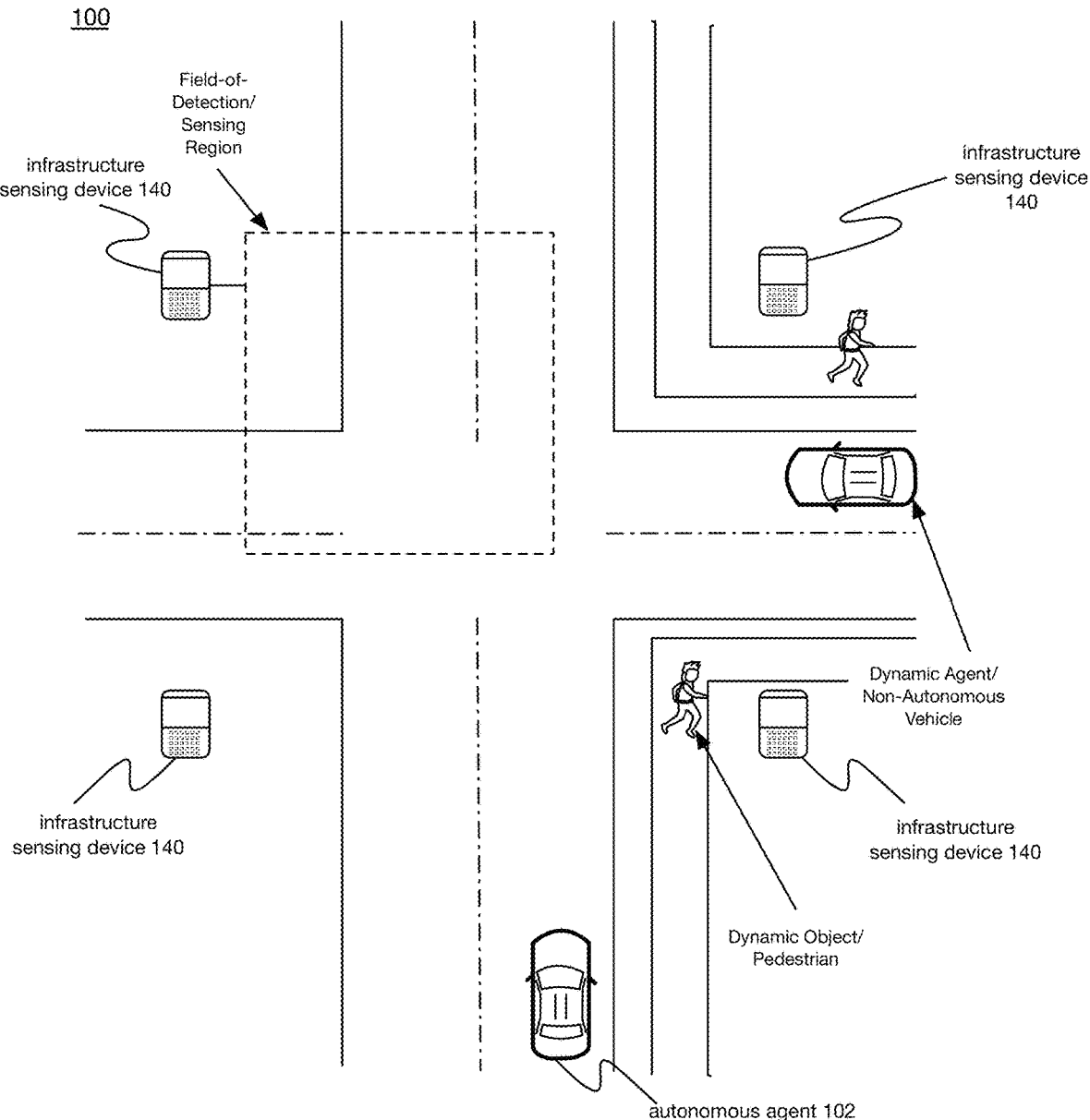
FIG. 4 is a schematic variation of an autonomous agent in its environment.

The system 100 can optionally include a set of infrastructure devices 140 (e.g., as shown in FIG. 4), equivalently referred to herein as roadside units, which individually and/or collectively function to observe one or more aspects and/or features of an environment and collect observation data relating to the one or more aspects and/or features of the environment. In preferred variations, the infrastructure devices additionally function to collect data associated with the observations and transmit the collected data and/or processed derivatives of the collected data to the autonomous agent (e.g., to an onboard computing system of the autonomous agent). Additionally or alternatively, the infrastructure devices can function to collect and transmit data to a teleoperator platform, wherein the teleoperators can use the data to inform their decision making, such as whether to include and/or exclude a behavioral policy from consideration by the computing system of the autonomous agent. In a specific example, for instance, an infrastructure device can enable a view around a corner of the vehicle to be seen, which the agent and/or an operator and/or a teleoperator of the agent can use to enable a turning behavioral policy to be considered by the autonomous agent (by seeing that the road is clear for a turn).

In some variations, the autonomous agent can augment and/or fuse data derived by an onboard sensor suite (e.g., as described below) with additional observations from the infrastructure devices (e.g., the roadside units) to improve the determination of the environmental representation. In specific examples, the infrastructure devices can detect and track any type or kind of objects in an operating environment, such as with a set of cameras or other sensors (e.g., LiDAR, RADAR, etc.). In some variations, for instance, a video camera can function to provide detection of objects and semantic classification of the object type and possible intent of an object, such as a pedestrian that is about to cross a road, or a car that is about to make a left turn, a driver which is about to open a car door and exit their vehicle, a bicyclist operating in a bike lane, and/or any other suitable information.

The system can optionally interface with a teleoperator platform 150, which refers to one or more remote teleoperators and associated components (e.g., communication interface with autonomous agent, computing system, output devices for displaying information from autonomous agents and/or infrastructure devices to teleoperators, input devices for receiving instructions/commands from teleoperators, etc.). The teleoperator platform can function to receive inputs from teleoperators, which can be used at least partially in the determination of the curated behavioral policies for the vehicle.

However, the system can include any other suitable components and/or can otherwise facilitate autonomous vehicle control.

4. Method

As shown in FIG. 2, the method S200 for dynamically updating a world representation of an autonomous agent includes receiving a set of inputs S210; generating an environmental representation S220; and updating the environmental representation S230. Additionally or alternatively, the method S200 can include operating an agent based on the environmental representation S240 (e.g., providing the environmental representation to a planning module) and/or any other suitable processes. Additionally or alternatively, the method S200 can include any or all of the processes described in any or all of: U.S. application Ser. No. 16/514,624, filed 17 Jul. 2019, now issued as U.S. Pat. No. 10,564,641; U.S. application Ser. No. 16/505,372, filed 8 Jul. 2019, now issued as U.S. Pat. No. 10,614,709; U.S. application Ser. No. 16/540,836, filed 14 Aug. 2019; and U.S. application Ser. No. 16/792,780, filed 17 Feb. 2020, now issued as U.S. Pat. No. 10,969,470; and U.S. application Ser. No. 17/365,538, filed 1 Jul. 2021; each of which is incorporated herein in its entirety by this reference, or any other suitable processes performed in any suitable order.

The method S200 functions to generate and/or dynamically update an environmental representation to facilitate control of an autonomous agent. Additionally or alternatively, the method can enable the agent to gain a comprehensive and high confidence understanding of its environment. Additionally or alternatively, the method S200 can function to correct past mistakes in its understanding of the environment and/or perform any other suitable functions. Further additionally or alternatively, the method can have usefulness in any other suitable applications, such as, but not limited to any or all of: traffic monitoring, military applications, air traffic control, and/or any other suitable applications.

Any or all of the method is preferably performed periodically (e.g., continuously, at a predetermined frequency, at random intervals, etc.) during the agent's traversal of a route. Additionally or alternatively, any or all of the method S200 can be performed: a predetermined number of times (e.g., 1, more than 1, etc.), in response to a trigger and/or until a trigger (e.g., until prompting from a trajectory planner from the agent, until a tracking cycle has ended, etc.), and/or at any other suitable times. In an example, S200 can generate updated environmental representations within a predetermined interval/frequency (e.g., predetermined tracking cycle) which can be less than 10 Hz, 10 Hz, 15 Hz, 20 Hz, 25 Hz, 30 Hz, greater than 30 Hz, any range bounded by the aforementioned values, and/or with any other suitable frequency. In a second variant, S200 can be executed in response to an event trigger (e.g., receipt of data, temporal trigger, etc.). In some variants, the update frequency and/or trigger can be based on a computing resource constraint (e.g., the update frequency can be based on a processing bandwidth of the computing system).

However, the method and/or various sub-steps can occur with any other suitable timing, frequency, and/or periodicity.

The method S200 can be performed with a system 100 (and/or the computing system 120 thereof) as described above and/or any other suitable system. The data processing of any or all of the method elements are preferably performed locally, but can additionally or alternatively include remote processing nodes. Data processing can be centralized (e.g., at a single compute node) or distributed (e.g., between multiple compute nodes or processing modules), and/or data processing modules (e.g., of the computing system) can be executed at the same endpoint or different endpoints. As an example, all data processing modules of can be onboard the vehicle and/or can be executed at a single processor. Data processing of various method elements can be synchronous or asynchronous and/or can be implemented with any suitable processing or communication redundancy. However, S200 can be performed with any other suitable processing and/or processing systems.

4.1 Method—Receiving a Set of Inputs S210

The method S200 includes receiving a set of inputs S210, which functions to receive data inputs and/or information which can be used to determine an environmental representation (e.g., to "color" awareness of the environment/world).

S210 can include any or all of: receiving sensor measurements from vehicle sensors (e.g., sensor suite), retrieving stored data/information (e.g., from a memory of the computing system and/or remote data storage; such as a prior ego-vehicle state(s) and/or a prior environmental representation(s); etc.). At least a portion of the set of inputs are preferably received from the sensor suite 110 of an autonomous agent (e.g., as described above), such as from any or all of the sensors described above (e.g., time-of-flight sensors, Lidar sensors, Radar sensors, cameras, microphones, etc.). Additionally or alternatively, inputs can be received from any extravehicular infrastructure/devices (e.g., part of one or more infrastructure devices, via the communication interface 130, etc.), other information sources (e.g., online information sources, databases, etc.), and/or any other suitable sources.

S210 is preferably performed initially in the method S200, further preferably throughout the method S200, such as any or all of: continuously (e.g., throughout the agent's traversal of a route), at a predetermined frequency, at a random set of intervals, in response to a trigger, and/or at any suitable times. Additionally or alternatively, S210 can be performed once, at any suitable time(s) during the method S200, and/or the method S200 can be performed in absence of S210. In variants, S210 can include or occur in conjunction with sampling sensor measurements for sensors of the sensor suite. Sensor measurements can be sampled synchronously (e.g., with a common frequency), asynchronously, periodically, aperiodically, and/or with any other suitable frequency. In variants, the set of inputs (e.g., sensor measurements) can be timestamped and/or batched over a timestep interval (e.g., which can be the same as an update/provision interval of S240 or different).

However, S210 can include receiving any suitable set of inputs, and may occur with any suitable timing/frequency.

4.2 Method—Generating an Environmental Representation S220

The method S200 includes generating an environmental representation S220, which functions to characterize (e.g., identify, distinguish, etc.) the objects surrounding the agent. Additionally or alternatively, S220 can function to form a basis with which to plan a vehicle's trajectory (e.g., to avoid the objects in the agent's environment); determine actual and/or predicted features (e.g., speed, motion, trajectory, path, current pose, future pose, etc.) associated with the objects surrounding the agent; characterize an initial environmental representation of the agent (e.g., within a predetermined time frame, within a predetermined amount of compute resources, etc.); and/or can perform any other suitable functions.

In variants, the environmental representation generated and/or output by S220 (e.g., in initial iteration of S220, in any iteration of S220, in all iterations of S220, etc.) can be a primitive environmental representation (e.g., to be further refined/updated by S230). As an example, S220 can generate an initial/primitive environmental representation in a fraction of an update interval (e.g., within tracking cycle, less than half of the span of the update interval), and the remaining duration is used to analyze, refine, and/or improve the object characterization with one or more iterations of S230. In a specific example, for instance, S220 is performed at each tracking cycle (e.g., a predetermined frequency), wherein the set of labels determined in that iteration of S220 is optionally refined (e.g., for a remaining duration allotted for that tracking cycle's decision making) in S230. Additionally or alternatively, a primitive environmental representation is generated in one or more initial iterations of S220, wherein future (e.g., subsequent) iterations of S220 and/or S230 function to analyze and/or refine this primitive environmental representation.

S220 is preferably performed in response to and based on the inputs received in S210. Additionally or alternatively, S220 can be performed in response to S230 (e.g., in place of S230, as part of S230, etc.); in response to any other process of the method S200; multiple times during the method S200 (e.g., continuously, at a predetermined frequency, in response to a trigger, etc.); and/or at any other suitable times during the method S200. In a specific example, S220 can be initiated at the beginning of an update interval of a planning module. Further additionally or alternatively, the method S200 (e.g., one or more iterations of S200) can be performed in absence of S220.

In a preferred set of variations, S220 is performed at least once during operation of the vehicle along a route. In specific examples, S220 is performed initially for the vehicle's traversal of the route, wherein the initial environmental representation produced in S220 is subsequently updated in one or more iterations of S230. In a second example, S220 can be performed repeatedly during operation/traversal of the vehicle (e.g., and each iteration optionally followed by an iteration of S230). Additionally or alternatively, S220 can be otherwise suitably performed with any other suitable timing.

S220 preferably includes labelling a set of objects S222, which functions to characterize, identify, and/or classify/tag objects in the environment of the agent (e.g., within a predetermined distance threshold, within a field of view, intersecting with a trajectory of the agent, etc.). Additionally or alternatively, labelling objects can function to establish a time-history of unique objects (e.g., "track" an object across multiple sensor frames and/or update intervals of a vehicle control system).

S222 is preferably performed with a set of one or more classifiers (e.g., dynamic object classifiers, static object classifiers, etc.; binary classifiers, multi-class classifiers, etc.), but can additionally or alternatively be performed with any or all of: computer vision techniques, machine learning models, object segmentation techniques, point cloud clustering, neural networks (e.g., pretrained to identify a specific set of objects-such as cars or pedestrians-based on the received inputs, etc.; convolutional neural network [CNN], fully convolutional network [FCN], etc.), object detectors/classifiers (e.g., You Only Look Once [YOLO] algorithm; non-neural net approaches such as Histogram of Oriented Gradients [HOG] and/or Scale-Invariant Feature Transform [SIFT] feature detectors, etc.), object trackers, and/or any other suitable processes.

Object labels can include an object instance identifier (equivalently referred to herein as an object ID). Each unique (e.g., independent) object and/or each approximation of a unique object is preferably labeled with an object instance identifier (ID) in an environmental representation (e.g., visual environmental representation used by the motion planner), wherein the object instance ID (equivalently referred to herein as an ID) identifies an object being tracked by the system (e.g., sensor fusion at a labeling subsystem, etc.) of the system. Each object is preferably assigned a unique object instance ID such that the object can be individually identified and distinguished from the others. Additionally or alternatively, multiple objects can have the same object instance ID (e.g., wherein all objects of the same type are associated with same ID), a single object can have multiple IDs, and/or other labels can be assigned to the objects in any suitable way(s). Object IDs can optionally be matched across frames (e.g., for a single object track; IDs paired with previous frame), and/or can be globally unique (e.g., for a single object track; for each object identified within the environmental representation and/or current frame).

Additionally or alternatively, the objects can be labeled with information other than object instance identifiers, such as vectors and/or other identifiers.

Labels can optionally include an object class or set of object classes associated with the object. For instance, a label can include (e.g., prescribe, define, assign, etc.) any or all of: an individual class (e.g., static object, infrastructure, etc.), a plurality of classes, a distribution of classes (e.g., a dynamic object may be associated with a distribution of classes such as: pedestrian, animal, crossing-guard, etc.; with an associated probability; etc.), and/or any other class or combination of classes. As an example, the set of objects can be classified and/or labelled as dynamic objects and/or types of dynamic objects (e.g., other vehicles, pedestrians, animals, moving objects, etc.), static objects and/or types of static objects (e.g., shopping cart, tree, infrastructure, etc.), but can additionally or alternatively include only dynamic objects, only static objects, and/or any combination of static and dynamic objects.

The labels can additionally include and/or be associated with (e.g., linked to in a lookup table, assigned, etc.) supplementary information (which can be any or all of: actual, predicted, and simulated), such as, but not limited to, any or all of: state and/or motion features of the objects (e.g., speed, acceleration, orientation, pose, location, path, etc.), attributes of the objects (e.g., moving vs. static, size, vehicle driven by a human operator vs. an autonomous vehicle, etc.), route information of dynamic objects (e.g., destination, starting point, etc.), and/or any other suitable information.

The supplementary information can be integrated into the label itself (e.g., wherein the particular label [e.g., ID] assigned to the detection is determined in part based on the supplementary information), supplementary to the label (e.g., as a supplementary label), integrated into a vector assigned to the detection and/or label, and/or otherwise used.

In variants, object labels can be generated using any suitable subsets and/or combination(s) of inputs received from S210. As an example, a combination of all sensor inputs can be cooperatively utilized to detect objects and/or generate object labels (e.g., fusing sensors at the object detection step; relevant data from all sensors provided as supplementary information for an object; etc.). Additionally or alternatively, object labels can be generated using distinct subsets of sensors and/or the corresponding sensor data. In a first example, a first object within the environment can be detected/labelled based on Lidar data from a set of Lidar sensors and a second object within the environment can be detected/labelled based on time-of-flight data from a set of time-of-flight sensors. In a second example, a first object within the environment can be detected/labelled based on Lidar data from a set of Lidar sensors and a second object within the environment can be detected/labelled based on Radar data from a set of Radar sensors. However, objects can be detected and/or labelled based on any suitable set of data.

However, objects can be otherwise suitably labelled.

Figure 5:
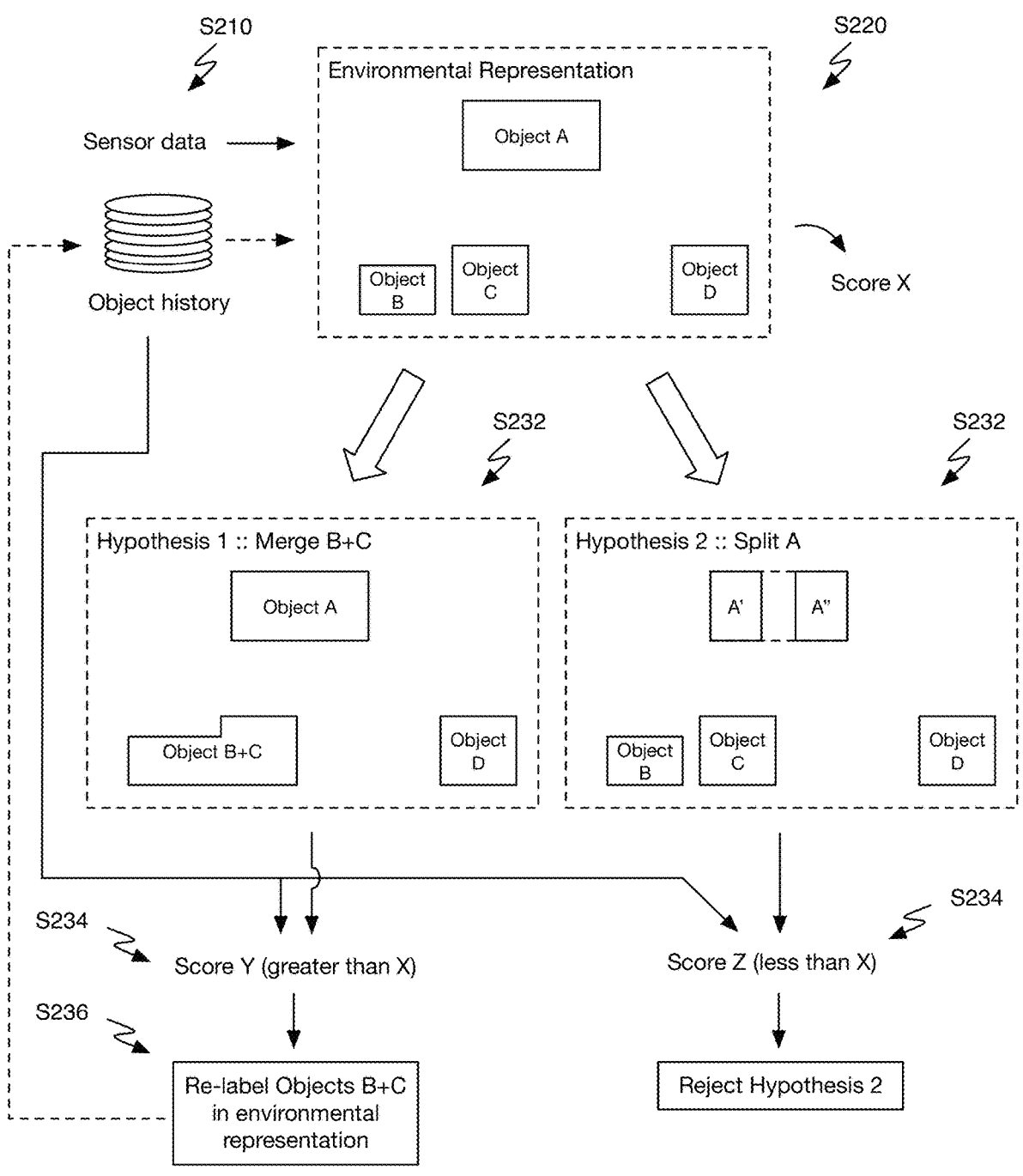
FIG. 5 is a diagrammatic representation of a variant of the method.

In variants, the set of labelled objects within the environmental representation may include inaccuracies (e.g., which can be determined in subsequent processes of the method such as in S230), such as those which may result based on an arrangement of objects within the environment (e.g., some objects in the scene may be obstructed by other objects or environmental features), observability of the objects by various sensors (e.g., for instance Lidar data may not fully capture a highly reflective object, such as a mirror, or an object obscured by smoke/fog), processing constraints (e.g., in a complex/object-rich environment), and/or any other features. Inaccuracies can include object-split inaccuracies, where a single entity has two objects/labels (e.g., which may be corrected by merging the split objects/labels), and object-merge inaccuracies—where multiple entities in the environment are assigned to a single object/label (e.g., which may be corrected by splitting the merged object/labels; an example is shown in FIG. 5). Additionally or alternatively, inaccuracies can additionally or alternatively include redundant labels (e.g., assigned when separately evaluating sets of inputs for different sets of sensors), inaccuracies in features (e.g., motion attributes) associated with an object (e.g., state estimates, speed, heading angle, etc.), and/or other inaccuracies in any part of the label(s) (e.g., class of object, route of object, etc.).

Additionally or alternatively, S220 can include any other processes performed in any suitable order.

4.3 Method—Updating the Environmental Representation S230

The method can include updating the environmental representation S230, which functions to correct inaccuracies in the environmental representation. Additionally or alternatively, S230 can function to confirm, expand upon, and/or correct inaccuracies of any or all the information captured in a previous (e.g., initial, last determined, etc.) environmental representation. Additionally or alternatively, S230 can function to perform any or all of: propagating updated information to prior environmental representations in order to correct the previous information; prepare an environmental representation which a planner can use to plan a trajectory for the agent; supplement a prior environmental representation (e.g., from S220, from a previous iteration of S230, etc.) to make it more coherent, complete, and/or robust; validate an environmental representation; and/or can perform any other suitable functions. In preferred variations, for instance, S230 functions to iteratively check if a primitive environmental representation made in S220 and/or a prior iteration of S230 was correct (e.g., based on sensor data from current and/or prior frames, etc.), and to correct any inaccuracies (e.g., in the current environmental representation frame and/or prior frames) as well as supplement the prior environmental representation with any relevant additional information (e.g., to enable trajectories to be robustly and reliably determined based on a comprehensive and accurate understanding of the vehicle's environment).

S230 is preferably performed in response to S220 and/or a prior iteration of S230, but can additionally or alternatively be performed in response to S240, and/or at any suitable time(s) during the method S200. S230 preferably occurs asynchronously with S220 (e.g., immediately following S220, during a remaining duration of an update interval, etc.), but can additionally or alternatively occur synchronously with S220 (e.g., S230 may continue evaluating and correcting inaccuracies in prior/historical environmental representation frames during S220; where S220 and S230 are performed by parallel processors and do not compete for processing bandwidth, etc.). S230 is preferably performed within an update interval and/or vehicle planning/control interval associated with the environmental representation (e.g., within a time interval of a frame, before the frame is provided for planning/control; before S240; etc.), but can additionally or alternatively be performed at any other suitable time(s).

S230 is preferably performed throughout the entire route traversal, wherein a most current environmental representation is used at any given time by the planning module, and wherein the environmental representation is continually updated as the vehicle traverses the route. Additionally or alternatively, S230 can be performed at least once during the method S200 and optionally multiple times throughout the method S200 (e.g., iteratively performed one after the other), such as until a trigger occurs and/or a set of criteria are satisfied. These can include, for instance, but are not limited to, any or all of: meeting a time threshold (e.g., time interval at which agent's planning module requires an environmental representation for path planning); meeting a distance threshold (e.g., distance traveled by vehicle); reaching a computing limitation; achieving a satisfactory score (e.g., in S230); prior to reaching a point of decreasing marginal returns (e.g., as identified by running any or all of the method offline [e.g., while not driving] with unlimited or substantially unlimited resources [e.g., using the entire tracking history of tracked objects rather than a shorter recent history and increase the available computing resources available]); performing a predetermined set of information processing processes (e.g., located and identified all objects surrounding the vehicle); and/or any other suitable triggers and/or criteria. Further additionally or alternatively, S230 can be performed at any other suitable times and/or for any suitable durations.

S230 is preferably performed based on a set of inputs received in S210 and the information from the most recent environmental representation(s) (e.g., from S220, from a previous iteration of S230, from the last N [e.g., between 1 and 10, between 1 and 5, greater than 5, greater than 10, at least 1 and less than 100, etc.] frames of the environmental representation, etc.), but can additionally or alternatively be performed based on any other suitable information.

In some variations, the environmental representation is updated in S230 as the agent obtains more information from the sensor system, which may clarify, confirm, and/or conflict with information (e.g., the set of labels, motion characteristics, etc.) associated with the objects in the agent's environments. This information can optionally include any or all of: additional sensor information from the same sensors and/or views (e.g., which can reduce the error in a monocular camera's depth perception; in a subsequent frame; etc.), sensor information from different and/or additional views, information from additional sensors, and/or any other information.

However, S230 can occur with any other suitable frequency and/or timing.

In a first example, for instance (e.g., as shown in FIG. 3A), two objects are identified at a first timestep (e.g., in S220, at an earlier instance of S230, etc.), wherein at a later second timestep, a single object (e.g., as shown in FIG. 3B) is moving in the location and/or speed predicted for the two objects. In this example, it can be determined that the two objects are/were associated with a single entity (i.e., are a single object; split inaccuracy identified), and they can be relabeled as such (with the prior hypothesis of two objects retroactively corrected; merged under a common object label and/or instance ID), wherein the relabeling includes reassigning the two objects to have the same object instance ID.

In a second example, for instance, at a first timestep, an object is identified and labeled with a first object instance ID. In S230, if it is determined that there is now an object with the first object instance ID moving left and another object with the first object instance ID moving right, it can be determined that there is a low confidence (in S230) that the objects are the same object (e.g., merge inaccuracy is determined), which can be corrected in S230.

In variants, updating the environmental representation S230 can include: determining a hypothesis S232, scoring the hypothesis S234, relabeling an object in the environmental representation S236, and/or any other suitable elements.

Determining a hypothesis S232 functions to hypothesize an updated environmental representation to correct a possible (e.g., hypothesized) inaccuracy in the environmental representation. The hypothesis preferably prescribes a set of one or more labels to each detected object (e.g., as described above), but can additionally or alternatively prescribe labels to a subset of objects, and/or include and/or assign any other information (e.g., an object type) to an environmental representation. In preferred variations, for instance, each hypothesis includes a set of labels for the tracked objects, wherein the set of labels includes at least a subset of revised labels relative to S220 (e.g., for objects which are proposed to split, for objects which are proposed to be merged, etc.), but can additionally include labels determined in S220 (e.g., for objects which are not associated with a split and/or merge in the hypothesis), labels determined in a previous iteration of S230, and/or any other labels.

Hypotheses can include: split hypotheses (e.g., each corresponding to a potential object-merge inaccuracy), in which a proposed label for an object is split into two or more labels (corresponding to two or more objects); merge hypotheses (e.g., each corresponding to a potential object-split inaccuracy), in which two or more proposed labels are merged into a single label (corresponding to a single object); any other hypotheses; and/or any combination of hypotheses. Additionally or alternatively, hypotheses can include proposed class adjustments, proposed label adjustments, and/or any other suitable hypotheses.

Split and/or merge proposals can be determined based on any or all of: spatial information (e.g., position of objects, distance between objects, etc.), motion information (e.g., velocity of objects, acceleration of objects, etc.), orientation information (e.g., heading angle of objects), historical information (e.g., object tracks, historical frames, pre-mapped objects proximal to a current vehicle location, etc.), other information, and/or any combination of information. In a first example, a hypothesis can include a proposal to split an object where a sufficient amount of space exists between detections within the object (e.g., minimum distance between two clusters of point cloud returns exceeds a predetermined threshold, density of image features falls below a sparsity threshold, etc.). In a second example, a hypothesis can include a proposal to merge two objects which move/translate together (e.g., have a same velocity or other motion feature as each other across a plurality of historical frames). In a third example, a hypothesis can include a proposal to merge two object labels (e.g., which appear as separate objects based on the associated time-of-flight sensing data) based on an object detector determining, from a subset of the associated sensor data (e.g., the optical/ visual imaging data), a single-entity classification probability which exceeds a predetermined threshold.

Hypotheses are preferably determined using any or all of: a set of criteria, rules, heuristics, learned criteria, neural networks (e.g., pre-trained to generate hypotheses for a given set of objects), and/or any other suitable techniques. Hypotheses can be determined based on fixed and/or dynamic criteria for the environmental representation. As an example, a merge hypothesis can be determined based on the proximity of two objects satisfying a fixed threshold. As a second example, a merge hypothesis can be determined based on the proximity of two objects satisfying a threshold which is dynamically adjusted based on the density of the environmental representation (e.g., number of objects in the scene, size of objects nearby, etc.).

In a first variant, a hypothesis can be determined according to a set of pre-defined rules/heuristics, which can be manually determined, generatively determined, learned prior to execution of the method, otherwise determined, and/or determined in any combination of ways. In a second variant, a hypothesis can be generated by a dedicated hypothesis model (e.g., neural network trained to select a hypothesis for an object scene). In a third variant, a hypothesis can be selected from a predetermined hypothesis and/or unexecuted hypothesis of a prior update interval (e.g., untested hypothesis of a prior frame, etc.).

In variants, hypotheses can be dynamically selected/ordered (e.g., for scoring according to S234), which can function to prioritize the most important, relevant, and/or likely hypotheses for scoring (e.g., according to S234). This can be beneficial in cases of limited compute and/or limited time until decision making (e.g., when a trajectory needs to be determined). Hypotheses can be dynamically selected/ordered based on any or all of: a scored hypothesis of a prior iteration (e.g., deprioritize a recently-rejected hypothesis; prioritize an inconclusive evaluation for re-evaluation with additional information; etc.), a vehicle state and/or direction of motion (e.g., if turning left: prioritize object hypotheses which are relevant to objects/entities to the left of vehicle), external sources of prioritization (e.g., high level vehicle plan motivates prioritization, vehicle goal such as progress toward destination, etc.), object class (e.g., hypotheses involving pedestrian object classes may be prioritized over infrastructure object hypotheses, for example), other prioritization criteria, and/or can be otherwise suitably selected/prioritized. Alternatively, hypotheses can be unordered.

In a first variant, all the generated hypotheses (e.g., matching set of rules) can be scored/tested. In a second variant, a subset of generated hypotheses can be scored/tested, such as based on an order of dynamically selected/prioritized hypotheses and the available processing bandwidth and/or remaining interval time. In a third variant, an un-evaluated hypothesis from a prior timestep can be selected and/or prioritized for scoring according to S234.

S232 is preferably performed as part of S230, but can additionally or alternatively be performed in response to S230, in response to S220, as part of S220, in response to S210, and/or at any other suitable times. S230 is preferably performed each time an environmental representation is determined or updated, but can additionally or alternatively be performed less frequently than this, more frequently than this, and/or at any other suitable times.

However, any other suitable hypotheses can be determined with any other suitable timing.

Scoring the hypothesis S234 functions to test if the hypothesis improves the environmental representation according to a set of one or more metrics (e.g., evaluating the intrinsic logic of the environmental representation). Additionally or alternatively, S234 can function to assess a confidence of a proposed updated environmental representation, assess a confidence or other parameter (e.g., accuracy, quality, etc.) of a prior and/or current and/or proposed environmental representation, trigger the updated environmental representation, trigger the correction of prior incorrect assumptions about the environment (e.g., correct an inaccuracy), and/or can perform any other suitable functions.

In a first example: if a hypothesis resolves an anomaly which deviates from the physics of the universe (such as an object disappearing, a failure of conservation of momentum, etc.), then the score of the hypothesis may be greater than the score of the frame and the hypothesis may be accepted (e.g., object(s) can be relabeled according to S236). In a second example: if a hypothesis creates a conflict between two discrete sets of sensors (e.g., a different number of objects detected by time-of-flight sensors and cameras), then the score of the hypothesis may be less than the native score of the frame and the hypothesis may be rejected. Additionally or alternatively, a hypothesis can be otherwise evaluated and/or selected.

Scoring the hypothesis can include determining a single score and/or multiple scores (e.g., which may be combined to yield a single score; 2 or more, between 10 and 20, 12, 15, more than 20, etc.). Each hypothesis is preferably scored with the same process and/or by the same cost function relative to the environmental representation, but can alternatively be evaluated by a different process and/or cost functions, and/or can be otherwise suitably scored. Scoring techniques, criteria, and/or metrics can be predetermined (e.g., with weights pre-assigned and/or learned prior to runtime execution of the method; invariant between evaluation of multiple hypotheses; invariant between multiple iterations of S234; etc.), however they can alternatively by dynamically determined and/or adjusted between multiple update iterations of S234.

Each score preferably reflects a confidence associated with the set of labelled objects in the environmental representation. The score/confidence can be determined based on any or all of: prior environmental representations (e.g., based on a level of agreement between the proposed labels and prior sets of labels, based on prior confidence scores, based on supplementary information such as motion information associated with prior identified objects, etc.), dynamic equations and/or rules (e.g., a trajectory of an object with the proposed label, kinematic equations, etc.), sensor information (e.g., sensor types, sensor fusion outputs, etc.), and/or any other suitable information.

In specific examples, for instance, when using monocular cameras, it can be difficult to estimate a true pose of one or more objects due to errors in depth estimation. Additionally or alternatively, fusing 2-dimensional and 3-dimensional sensor information can be difficult. The relabeling subsystem(s) can function to correct errors that arise like these, which may influence the prior identification of objects and/or their associated information.

The outputs of S234 and/or each score are preferably determined with one or more trained models (e.g., machine learning models, deep learning models, neural networks, etc.), wherein the model is preferably trained based on real-word data and can additionally or alternatively be trained with any or all of: supervised learning, semi-supervised learning, unsupervised learning, and/or any other suitable training. Additionally or alternatively, the score can be determined with simulated data; one or more programmed/rule-based processes and/or any other suitable models, algorithms, equations, decision trees, and lookup tables; and/or a score can be determined with any other suitable tools.

The score can optionally take into account any or all of: consistencies of motion (e.g., smoothness of a trajectory[ies] and/or track[s]) of the objects (e.g., wherein the score penalizes hypotheses and/or labels which cause objects to move in unnatural and/or impossible trajectories); parameters (e.g., maximum velocity, minimum velocity, average velocity, etc.) associated with one or more objects (e.g., in comparison with expected values, in comparison with traffic rules, etc.); a level of agreement between different sensors and/or sensor types of the agent; label properties (e.g., overlapping vs. distinct); and/or any other suitable information. The score can optionally additionally or alternatively take into account one or more penalties, such as any or all of: disagreement of a label and/or supplementary information with different sensor sources (e.g., camera vs. LIDAR); disagreement of a label and/or supplementary information with previous object labels; disagreement of a label and/or supplementary information with equations (e.g., dynamic equations) and/or rules; an inability to produce a smooth trajectory for the object based on the label; an arrangement of the labels relative to each other (e.g., penalize if overlapping); and/or any other suitable penalties.

The score can optionally leverage previous/historical data, such as referring to a record of prior labels to find out if and how objects were previously labelled and/or relabeled in prior frames of the environmental representation. In specific examples, for instance, if a label is now associated with high uncertainty and was previously changed, there may be a high confidence associated with reverting the label to what it was before it was changed.

In variants, multiple hypotheses can be scored/evaluated in parallel (e.g., by a plurality of parallel relabeling subsystems evaluating separate hypotheses), but can additionally or alternatively be run in series and/or any combination. The number of hypotheses that are scored and/or the way in which they are run (e.g., parallel, series, etc.) can be any or all of: predetermined (e.g., based on resource limitations, based on the types of sensors in the sensor system, etc.), dynamically determined (e.g., based on resource limitations), prioritized (e.g., based on which hypotheses are most likely, based on which hypotheses correspond to a critical scenario, based on which hypotheses affect an object in close proximity to the ego agent, etc.), and/or otherwise determined.

S234 preferably includes, for each hypothesis, determining a score associated with the hypothesized environmental representation (e.g., score of the current frame). In a first variant, S234 can include scoring a primitive environmental representation (e.g., from S220). Additionally or alternatively, the score can be returned as a difference in the scoring function relative to the current frame (e.g., where a positive score represents an improvement over the primitive environmental representation and/or a previous environmental representation). In a second variant, the score of an accepted hypothesis (e.g., relabeled in S236) can be used as a basis for subsequent iterations and/or scoring in S234. However, the hypotheses can be scored independently of a prior score, and/or otherwise scored/evaluated relative to the environmental representation (of the current frame).

However, hypotheses can be otherwise suitably scored.

S236 can optionally include relabeling an object in the environmental representation S236, which functions correct inaccuracies in the environmental representation and/or refine environmental representation based on the hypothesis to improve scene accuracy and/or intrinsic logic. Additionally or alternatively, S236 can adjust the environmental representation to improve its score (e.g., relative to a scoring function).

S236 can include updating the environmental representation to reflect the object labels of the hypothesis (e.g., hypothesis directly taken as the environmental representation of the current frame; update the environmental representation based on a proposed set of splits/merges within the hypothesis, etc.). In the event that the environmental representation is updated, S236 preferably includes relabeling any or all of the set of objects within the current frame (e.g., with the same labels, with different labels based on the hypothesis, etc.), wherein the set of objects are preferably relabeled according to the hypothesis associated with the highest score and/or if the score improves a prior score associated with the previous set of object labels. Additionally or alternatively, the objects can be otherwise relabeled, only a subset of the set of objects can be relabeled, any or all of the objects can retain their previous labels, and/or objects can be otherwise labeled.

S236 preferably includes relabeling objects in a current frame (e.g., current timestep, prior to provision of the environmental representation S240), but can additionally or alternatively include relabeling an object in a historical frame (e.g., historical timestep) and/or modifying an object track (which refers to a set of positions and/or trajectory of the object) across multiple frames (e.g., object label and/or instance ID across multiple frames), such as along the object's entire editable history. S236 preferably occurs in response to a hypothesis improving a score of the environmental representation (e.g., which may occur once, multiple times, and/or never for various frames), however S236 can additionally or alternatively occur at a termination of an update interval (e.g., based on highest scoring hypothesis), based on a satisfaction of a convergence condition (e.g., score improvements asymptotically approach maximum score, etc.), and/or with any other suitable timing/frequency.

The relabeling and scoring operations are preferably run in parallel, but can additionally or alternatively be run in series and/or any combination. The number of relabeling subsystems and/or the way in which they are run (e.g., parallel, series, etc.) can be any or all of: predetermined (e.g., based on resource limitations, based on the types of sensors in the sensor system, etc.), dynamically determined (e.g., based on resource limitations), and/or otherwise determined. Each of the relabeling subsystems is preferably run multiple times during each iteration of S230, but any or all of the relabeling subsystems can additionally or alternatively be run only once (e.g., in an event of resource constraints).

However, objects can otherwise be relabeled within the environmental representation.

In variants, S230 can optionally include evaluating a prior environmental representation (e.g., based on new inputs, in the context of new object labels, etc.), such as to see if the identification of previous objects still agrees with the updated information (e.g., distinct objects are still distinct, single objects are still contiguous, etc.). This can include, for instance, checking to see any or all of: the points associated with a single object are contained within a continuous boundary; if previously overlapping objects are still overlapping; if the distance between objects has changed; and/or checking for any other suitable information.

In variants, in response to updating the environmental representation and/or relabeling, the method can optionally include correcting information which is now deemed incorrect (e.g., at odds with the newest set of relabels and/or environmental representation). This can have numerous benefits, such as those in intent estimation of other objects as it is not only important to know what an object is doing right now, but also important to know what the object has been doing. In examples, for instance, it may appear in a current instance that a vehicle is driving diagonally—from previous information, however, it can be determined that the vehicle is actually approaching a turn. By being able to correct previously-made, incorrect assumptions, this benefit is maintained and can be trusted.

However, the environmental representation can be otherwise suitably updated and/or S230 can include any other processes performed in any suitable order.

4.5 Method—Operating an Agent Based on the Environmental Representation S240

The method S200 includes operating an agent based on the environmental representation S240, which functions to provide the environmental representation to a vehicle control system and/or a planning module therein to implement the environmental representation in the decision-making of the agent (e.g., planning, behavioral selection, trajectory generation, etc.). Additionally or alternatively, S240 can function to terminate a cycle of updating the environmental representation, such as upon determining that the environmental representation can be trusted (e.g., based on a score) and/or based on temporal and/or compute limitations. Additionally or alternatively, S240 can include any other suitable processes, such as, but not limited to: determining a trajectory for the agent; implementing an emergency behavior; and/or any other actions. In variants, the environmental representation can be used for intent estimation of the environmental agents/objects (e.g., for use in a simulation), used as input to a multi-policy decision making module, used to determine a trajectory for the ego agent, used to operate the ego agent (e.g., control the ego agent), and/or used in any other suitable ways. In specific examples, for instance, operating the agent includes and/or interfaces with any or all of the methods described in: U.S. application Ser. No. 16/514,624, filed 17 Jul. 2019, now issued as U.S. Pat. No. 10,564,641; and/or U.S. application Ser. No. 17/365, 538, filed 1 Jul. 2021; each of which is incorporated herein in its entirety by this reference.

However, the environmental representation can be otherwise provided and/or used.

4.6 Method—Variations

In a first variation of the method, multiple hypotheses can be determined for a current environmental representation (e.g., a primitive environmental representation received from S220; an environmental representation determined from a prior iteration of S230; etc.), each hypothesis including (e.g., prescribing) labels corresponding to each object in the environmental representation. The hypothesis can be evaluated by scoring the environmental representation (e.g., using a series of evaluation metrics, using a model of a relabeling module, etc.). The scores can be compared against the score of a current environmental representation and/or prior environmental representations to determine a difference. In one example, a hypothesis whose score exceeds that of the current environmental representation (e.g., and/or which has the greatest global score; highest scoring hypothesis) can be taken as the new environmental representation (e.g., the objects labels of the environmental representation can be updated based on the hypothesis; objects can be relabeled based on the hypothesis).

Additionally or alternatively, any or all of the hypotheses can include labels for only a subset of objects in the environmental representation (e.g., wherein other objects have labels from S220, wherein other objects have no labels, etc.).

Further additionally or alternatively, the scores from multiple hypotheses can be compared against each other (e.g., wherein the highest score is used, wherein the highest score is compared with the score from S220, etc.).

In a second variation, additional to the first, hypotheses can be prioritized for subsequent evaluations (e.g., at a subsequent tracking cycle) based on their scores and/or their difference in score relative to a score in S220 and/or relative to each other (i.e., lowest scoring hypothesis can be de-prioritized, hypotheses having small score differences relative to prior environmental representations can be repeatedly evaluated until the labels can be disambiguated, etc.).

In a third variation of the method, a relabeling subsystem can generate one or more hypotheses for each object and evaluate to determine an object label for each object.

In one variant, a method can include: determining a set of measurement inputs using a sensor suite of a vehicle; using an object tracking system, generating an environmental representation based on the measurement inputs, the environmental representation comprising a set of labelled objects in an environment of the vehicle; determining a hypothesis for a subset of the labelled objects; determining a score for the hypothesis based on a plurality of historical environmental representations associated with the subset of labelled objects; based on the score, updating the environmental representation, including: relabeling the subset of objects based on the hypothesis; and providing the updated environmental representation to a processor onboard the vehicle.

In one variant, a system can include, for a vehicle: a sensor suite onboard the vehicle and configured to generate a set of measurements, wherein the set of measurements corresponds to a measurement time; a memory comprising a set of historical environmental representations; an object tracking system configured to generate an environmental representation based on the measurements, the environmental representation comprising a set of labelled objects; a processing system configured to, within a time interval immediately following the measurement time, repeatedly: determine a first score for the environmental representation based on the set of historical environmental representations; determine a hypothesis for a subset of the labelled objects; determine a second score for the hypothesis based on the set of historical environmental representations; and in response to the second score exceeding the first score, update the environmental representation, comprising: relabeling the subset of objects according to the hypothesis; and a controller configured to operate the vehicle based on the updated environmental representation.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method comprising:
with an object tracking system, determining an environmental representation based on a set of inputs from a sensor suite of a vehicle, the environmental representation comprising a plurality of object representations, each object representation labeled with a respective instance identifier;
scoring a hypothesis associated with at least a subset of object representations of the plurality;
refining the environmental representation based on the scored hypothesis, comprising relabeling the respective instance identifier of at least one object representation of the subset, wherein relabeling the respective instance identifier comprises relabeling an instance identifier, determined at a prior timestep, which represents distinctness of the at least one object representation of the subset; and
autonomously controlling the vehicle based on the refined environmental representation.

2. The method of claim 1, wherein the hypothesis is selected from a predetermined set of hypotheses comprising an object-merge hypothesis and an object-split hypothesis.

3. The method of claim 2, wherein the hypothesis is selected based on satisfaction of a proximity rule by the subset of object representations.

4. The method of claim 1, wherein the hypothesis is scored based on a set of object tracks, each object track of the set corresponding to the respective instance identifier of a respective object representation of the subset.

5. The method of claim 4, wherein scoring the hypothesis comprises evaluating a smoothness of an object trajectory of an object track.

6. The method of claim 4, further comprising: modifying the set of object tracks based on the relabeling of the respective instance identifier of the at least one object representation of the subset.

7. The method of claim 6, wherein the environmental representation is determined based on a set of historical environmental representations, wherein modifying the set of object tracks comprises relabeling object representations in the plurality of historical environmental representations.

8. The method of claim 1, wherein scoring the hypothesis comprises evaluating a set of individual metrics for each object representation of the subset.

9. The method of claim 8, wherein scoring the hypothesis further comprises evaluating global metrics for the plurality of object representations.

10. The method of claim 1, wherein scoring the hypothesis comprises evaluating a cost function for the hypothesis across a plurality of historical environmental representations.

11. The method of claim 1, wherein relabeling the respective instance identifier of the at least one object representation of the plurality of object representations comprises fusing a first and second object representation under a singular label.

12. The method of claim 1, wherein the set of inputs are received from the sensor suite at a first time, wherein the refined environmental representation is provided to an autonomous controller of the vehicle within a predetermined time interval after the first time, wherein the environmental representation is determined with the object tracking system during a first portion of the predetermined time interval, wherein refining the environmental representation occurs during a remainder of the predetermined time interval after the first portion of the predetermined time interval, wherein the vehicle is autonomously controlled based on the refined environmental representation after the predetermined time interval.

13. The method of claim 1, wherein relabeling the respective instance identifier is performed during operation of the vehicle.

14. A system comprising:
an object tracking system configured to generate an environmental representation, based on a set of inputs from a sensor suite of a vehicle, within a time interval immediately following a measurement time associated with the set of inputs, wherein the environmental representation comprises a set of object representations;
a computing system configured to receive the environmental representation after a first portion of the time interval and, during a remainder of the time interval, repeatedly:
score hypotheses for the environmental representation, each hypothesis associated with a respective subset of the set of object representations; and
in response to a score of a hypothesis exceeding a threshold, relabel the respective subset of object representations according to the hypothesis to refine the environmental representation, wherein relabeling the respective subset of object representations comprises: relabeling an instance identifier, determined prior to the time interval, which represents distinctness of at least one object representation of the subset; and
a controller configured to operate the vehicle based on the refined environmental representation after the time interval.

15. The system of claim 14, wherein the threshold comprises a reference score of the environmental representation.

16. The system of claim 14, wherein hypotheses are selected from a predetermined set of hypotheses comprising an object-merge hypothesis and an object-split hypothesis.

17. The system of claim 16, wherein the hypotheses are selected based on satisfaction of a proximity rule by the subset of object representations.

18. The system of claim 14, wherein the hypotheses are scored based on a set of object tracks, each object track of the set corresponding to the instance identifier of a respective object representation of the subset.

19. The system of claim 18, wherein the hypotheses are scored based on a smoothness of object trajectories associated with the set of object tracks.

20. The system of claim 18, further comprising: modifying the set of object tracks based on the relabeling of the respective instance identifier of the at least one object representation of the subset.

21. The system of claim 14, wherein the hypotheses are scored by evaluating a cost function for each hypothesis across a plurality of historical environmental representations.

* * * * *